US006658408B2

(12) United States Patent
Yano et al.

(10) Patent No.: US 6,658,408 B2
(45) Date of Patent: Dec. 2, 2003

(54) DOCUMENT INFORMATION MANAGEMENT SYSTEM

(75) Inventors: Takashi Yano, Tokyo (JP); Yasuhiro Tabata, Kanagawa (JP); Hisashi Ishijima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/126,588

(22) Filed: Apr. 22, 2002

(65) Prior Publication Data

US 2003/0018611 A1 Jan. 23, 2003

Related U.S. Application Data

(63) Continuation of application No. 09/305,473, filed on May 6, 1999, now Pat. No. 6,381,593.

(30) Foreign Application Priority Data

May 8, 1998 (JP) ............................................. 10-126515
Aug. 18, 1998 (JP) ............................................. 10-231845

(51) Int. Cl.[7] ............................................... G06F 17/30
(52) U.S. Cl. ......................... 707/3; 707/10; 707/104.1; 345/968; 345/738
(58) Field of Search ........................... 707/3, 10, 104.1, 707/513, 531, 501.1; 709/219, 217; 345/760, 854, 856, 968, 738–739

(56) References Cited

U.S. PATENT DOCUMENTS

| | | | |
|---|---|---|---|
| 5,490,217 A | 2/1996 | Wang et al. | .................. 380/51 |
| 5,535,063 A | 7/1996 | Lamming | ...................... 360/4 |
| 5,640,193 A | 6/1997 | Wellner | ...................... 725/100 |

(List continued on next page.)

FOREIGN PATENT DOCUMENTS

JP 9-91301 4/1997 ........... G06F/17/30

OTHER PUBLICATIONS

Ploger et al., "WWW Based Structuring of Codesigns", System synthesis, 1995., proceedings of the eighth international symposium, Sep. 13–15, 1995, pp. 138–143.*
Google Toolbar (http://toolbar.google.com/button_help.html pp. 1–4.
Hotclick function of Opera for Windows (http://www.opera.com/support/tutorials/opera/using/coolfeatures/); pp. 1–2.
Babylon–Pro, Printed Nov. 14, 2002, Babylon Ltd, pp. 1–5, http://www.babylon.com/display.php?id=14&tree=3&level=2.
Kathy Berkemeyer, et al, DDC Quick Guide for Corel WordPerfect 7 for Windows 95, Copyright 1996, pp. 69–70 and 187–188.
Gerald Joyce, et al, Microsoft Word 97 At A Glance, Copyright 1997, pp. 18, 19, 280–286.

(List continued on next page.)

Primary Examiner—Greta Robinson
Assistant Examiner—Mohammad Ali
(74) Attorney, Agent, or Firm—Oblon, Spivak, McClelland, Maier & Neustadt, P.C.

(57) ABSTRACT

A document information management system in which a search-engine-compatible interface unit makes a word in a document displayed on the screen to be specified, transfers the specified word to a search engine as a keyword to be used in the search engine, receives a search result from the search engine, and displays the search result on the screen, while a browser-compatible interface unit performs a search (a keyword search and/or global search) by using the keyword transferred from a browser and transfers a search result to the browser.

66 Claims, 18 Drawing Sheets

U.S. PATENT DOCUMENTS

| | | | | |
|---|---|---|---|---|
| 5,642,502 A | | 6/1997 | Driscoll | 707/5 |
| 5,748,805 A | | 5/1998 | Withgott et al. | 382/306 |
| 5,760,382 A | | 6/1998 | Li et al. | 235/436 |
| 5,794,236 A | | 8/1998 | Mehrle | 707/5 |
| 5,805,740 A | | 9/1998 | Takagi et al. | 382/257 |
| 5,812,123 A | | 9/1998 | Rowe et al. | 725/43 |
| 5,847,708 A | * | 12/1998 | Wolff | 345/764 |
| 5,873,735 A | | 2/1999 | Yamada et al. | 433/221 |
| 5,895,470 A | | 4/1999 | Pirolli et al. | 707/102 |
| 5,963,965 A | | 10/1999 | Vogel | 715/501.1 |
| 5,974,202 A | | 10/1999 | Wang et al. | 382/306 |
| 6,012,053 A | * | 1/2000 | Pant et al. | 345/866 |
| 6,018,345 A | * | 1/2000 | Berstis | 345/667 |
| 6,035,308 A | | 3/2000 | Yano et al. | 715/501.1 |
| 6,041,335 A | | 3/2000 | Merritt et al. | 715/512 |
| 6,081,261 A | | 6/2000 | Wolff et al. | 345/179 |
| 6,356,923 B1 | | 3/2002 | Yano et al. | 717/127 |
| 6,381,593 B1 | * | 4/2002 | Yano et al. | 345/760 |
| 6,446,096 B1 | * | 9/2002 | Holland et al. | 715/513 |
| 2002/0036694 A1 | * | 3/2002 | Merril | 348/220 |

OTHER PUBLICATIONS

C. Apte, et al., ACM Transactions on Information System, vol. 12, No.3, pp. 233–251 "Automated Learning of Decision Rules for Text Categorization", Jul. 1994.

C. Chekuri, et al., $6^{th}$ WWW Conference, pp. 1–11, "Web Search Using Automatic Classification", 1996.

T. Darnell, Health Management Technology, vol. 18, No. 2, 5 pages, "Device as Dynamic as the People Who Us Them", Feb. 1997.

J.G. Spooner, PC Week, vol. 14, No.42, 2 pages, "Penright Boosts OS Support", Oct. 6, 1997.

* cited by examiner

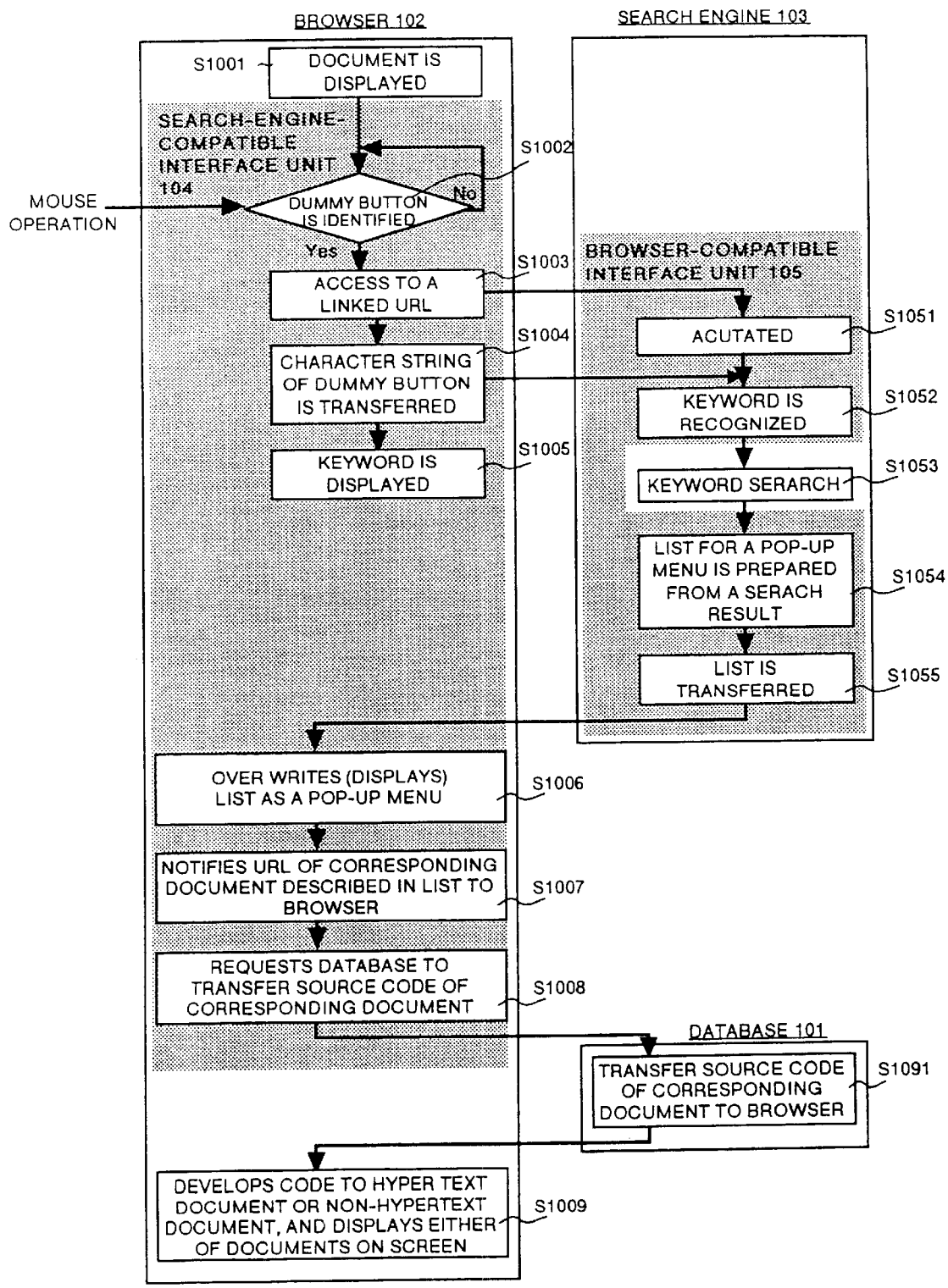

DOCUMENT INFORMATION MANAGEMENT SYSTEM

FIELD OF THE INVENTION

The present invention relates to a document information management system enabling search of documents only by specifying an arbitrary word as a keyword in a hypertext or a non-hypertext document displayed on a screen.

BACKGROUND OF THE INVENTION

Conventionally, a form of a document commonly used in the world has generally been a paper document, but progress of the Internet or intranet has given a birth to a hypertext as an electronic document which can compete for the first time against the paper document. This hypertext document is a document written in HTML in a narrow sense, and includes all the electronic documents which can link between documents such as PDF documents by Adbe and a portion of an SGML document by CALS (namely, between a button comprising a particular word, a text, a symbol or graphics and a document) in a broad sense.

Specifically, the hypertext is a collection of linked texts (electronified documents) and is the basic concepts for multimedia software with which texts hierarchically related to each other can simultaneously be referred from multiple sites to in an arbitrary order through a link structure. Therefore, each document of this hypertext includes information for forming the link structure (namely, information as a hypertext) in addition to information visually provided to users.

By the way, in the field of computer technology, a search engine is provided as a means of searching for a document linked to a particular word (keyword) from vast number of undefined documents. It should be noted that in the conventional type of search engine a keyword is not entered in a document but it is entered in a particular dialog box.

However, although there are many advantages in the hypertext, a jump can be made only to a linked page (document), and so, when a user wants to have information related to any word not linked to some other documents, it is necessary to actuate a search engine or the like and perform a search (a keyword search or a global search), which makes the operation complicated, and also linkage among documents is not easy therefore it is not always easy to use the hypertext.

In the conventional type of hypertext, an operation with one button can be linked only to one document (page), which does not allow a plurality of documents to be referred to with one button. Especially, the Intranet documents are highly specialized so that there may exist a plurality of information that the user wants to refer to with one button, hence convenience of use and workability are not sufficient for the situation.

In the conventional type of search engine, a user interface is of inferior performance as compared to a hypertext and the operating method is also different, and so, insufficient workability and convenience are found in actuation of a search engine and performance of a search during operation of the hypertext. Especially, in a browser function for displaying and operating a hypertext on a screen, it is general to operate only with a pointing device such as a mouse, so that entry of a keyword into a dialog box of the search engine through a keyboard disturbs the flow of work.

SUMMARY OF THE INVENTION

It is an object of the present invention to get, for the purpose of solving the problems, enhanced convenience in document information management as well as in a document search, improved operability of a keyword search, and further promoted workability when a search is performed through a hypertext by performing a search (a keyword search and/or a global search) with any word which is not linked to other documents as a keyword through a clicking operation thereon and enabling jumping from the clicked word to a page as an object to be searched like that with a button in a hypertext.

In the document information management system according to the present invention, a search-engine-compatible interface unit makes a word in a document displayed on the screen to be specified, transfers the specified word to a search engine as a keyword to be used in the search engine, receives a search result from the search engine, and displays the search result on the screen. On the other hand, a browser-compatible interface unit performs a search by using the keyword transferred from a browser and transfers a search result to the browser. Thus, by performing a search (a keyword search and/or a global search) with a word which is not liked to any document as a keyword through a clicking operation on the word, and enabling jumping from the clicked word to a page as an object to be searched like that with a button of a hypertext, it is possible to improve convenience in document information management as well as in a document search.

In the document information management system according to another aspect of the present invention, a search-engine-compatible interface unit makes a word in a document displayed on the screen to be specified, actuates a search engine and make the engine perform a search with the specified word as a keyword to be used in the search engine, receives a search result from the search engine and displays the result on the screen. Thus, by performing a search with a word which is not liked to any document as a keyword through a clicking operation on the word, and enabling jumping from the clicked word to a page as an object to be searched like that with a button of a hypertext, it is possible to improve convenience in document information management as well as in a document search.

Other objects and features of this invention will become apparent from the following description with reference to the accompanying drawings.

BRIEF DESCRIPTION OF THE DRAWINGS

FIG. 10 is a schematic flow chart of a document information management system according to Embodiment 4;

DESCRIPTION OF THE PREFERRED EMBODIMENTS

Detailed description is made hereinafter for the document information management system according to the present invention in the order of Embodiment 1 to Embodiment 7 with reference to the accompanied drawings.

The document information management system according to Embodiment 1 is a system for getting enhanced convenience in document information management as well as in a document search, improved operability of a search, and further promoted workability when a search is performed through a hypertext by using a document displayed on the screen of a browser as a front end of a search engine and displaying a search result by the search engine on the screen of the browser.

Figure 1:
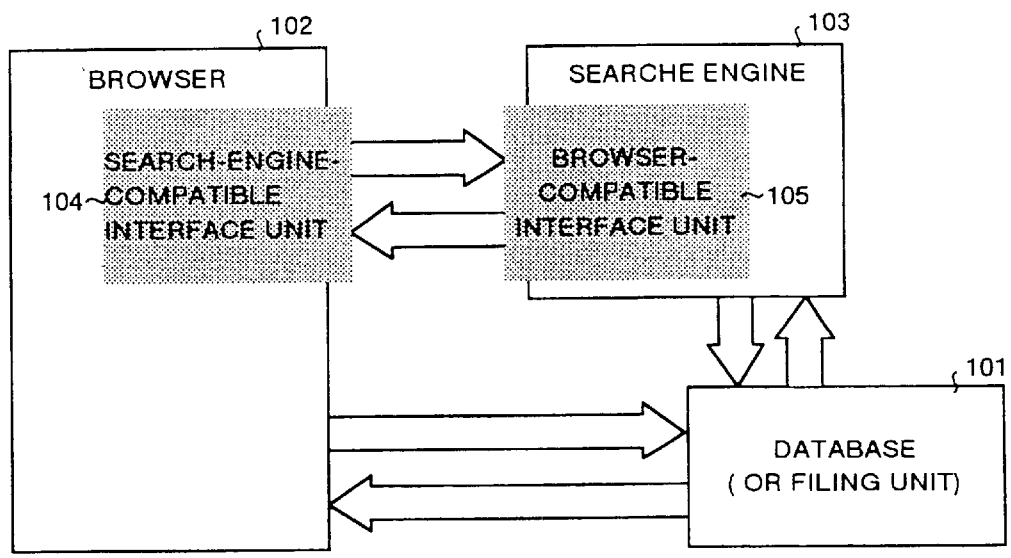
FIG. 1 is a view showing a document information management system according to Embodiment 1 of the present invention represented in the claim.

FIG. 1 shows the document information management system according to Embodiment 1 represented in the claim which comprises at least one database or a filing unit (described only as the database hereinafter to make description simpler) 101 for storing therein a plurality of document files comprising a hypertext document written in hypertext language such as HTML and/or a non-hypertext document prepared with an application such as word processor, a browser 102 having a browsing function for displaying and operating the hypertext document and the non-hypertext document on a screen, and a search engine 103 having a search-engine function of searching for a corresponding document through the database (or the filing unit) 101 according to a specified keyword.

It should be noted that the browser 102 has a search-engine-compatible interface unit 104 for specifying a word in a document displayed on the screen, transferring the specified word to the search engine 103 as a keyword to be used in the search engine 103, receiving a search result from the search engine 103, and displaying the search result on the screen. Herein, the browser 102 receives a list for a pop-up menu from the search engine 103 (browser-compatible interface unit 105) as a search result by the search (keyword search or/and global search), and displays the pop-up menu in a space adjacent to the specified word.

The search engine 103 has a browser-compatible interface unit 105 for performing a search by using the keyword transferred from the browser 102 (to be precise search-engine-compatible interface unit 104) and transferring a search result to the browser 102 (to be precise search-engine-compatible interface unit 104). Herein, the search engine 103 prepares a list for a pop-up menu and transfers the list to the search-engine-compatible interface unit 104.

Figure 2:
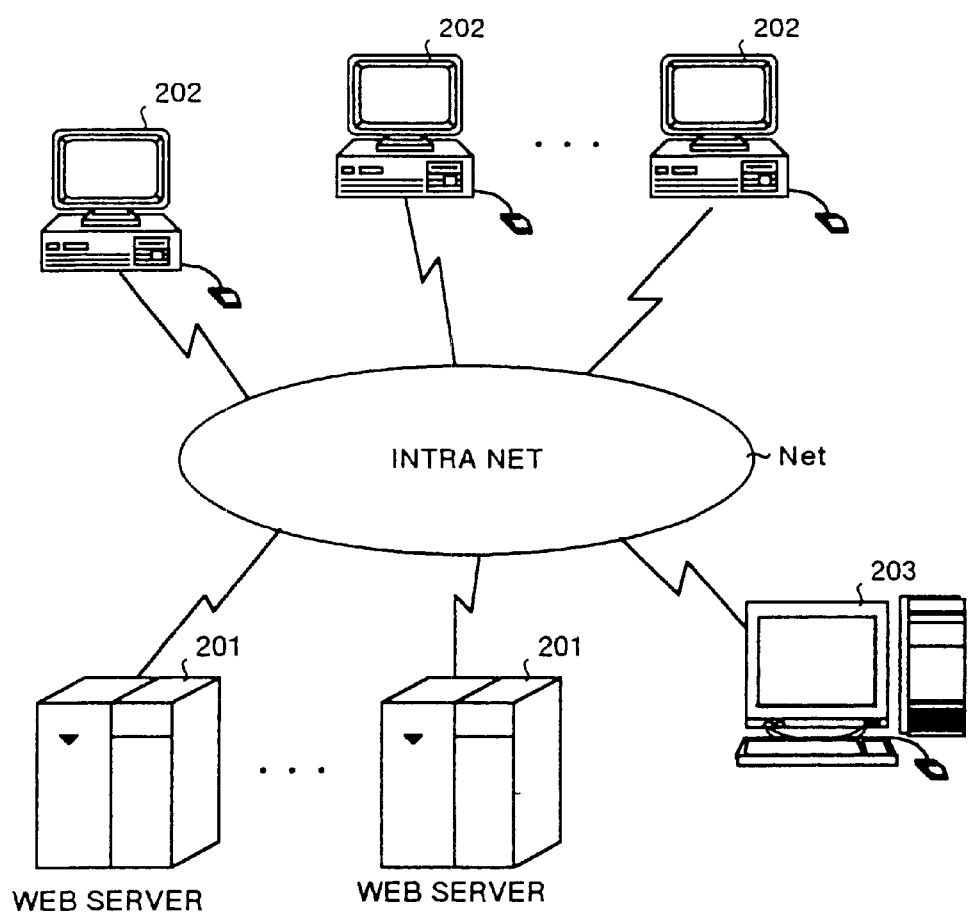
FIG. 2 is an explanatory view showing a concrete example of hardware configuration of the document information management system according to Embodiment 1.

FIG. 2 shows a concrete example of hardware configuration of the document information management system according to Embodiment 1, in which a plurality of Web servers 201 connected to a network such as the Intranet can be used as databases 101. This Web server 201 has a large-capacity hard disk device for storing the documents (hypertext documents and non-hypertext documents) to be used in the system.

As the browser 102, a terminal unit 202 such as a personal computer with built-in application software for realizing a browser function can be used. This terminal unit 202 has at least a display for displaying a document thereon, a pointing device such as a mouse for operating the screen, and a communication unit for carrying out communications through a network Net. Of course, the search-engine-compatible interface unit 104 is incorporated in the terminal unit 202 as one function of application software for realizing a browser function. A number of terminal units 202 is not particularly specified, and so it is needless to say that a plurality of terminal units 202 can be provided on the network Net as shown in the figure.

As the search engine 103, a terminal unit 203 such as a personal computer with built-in application software for realizing a search engine function can be used. This terminal unit 203 is connected to the network Net, and a plurality of units may be provided. One terminal unit can also be shared for the terminal unit 202 as the browser 102 and the terminal unit 203 as the search engine 103. More specifically, the application software for realizing the search engine function may be incorporated in the terminal unit 202 with the built-in application software for realizing the browser function. Of course, the browser-compatible interface unit 105 is incorporated in the terminal unit 203 (together with the search engine 103) as one function of application software for realizing a browser function.

Figure 3:
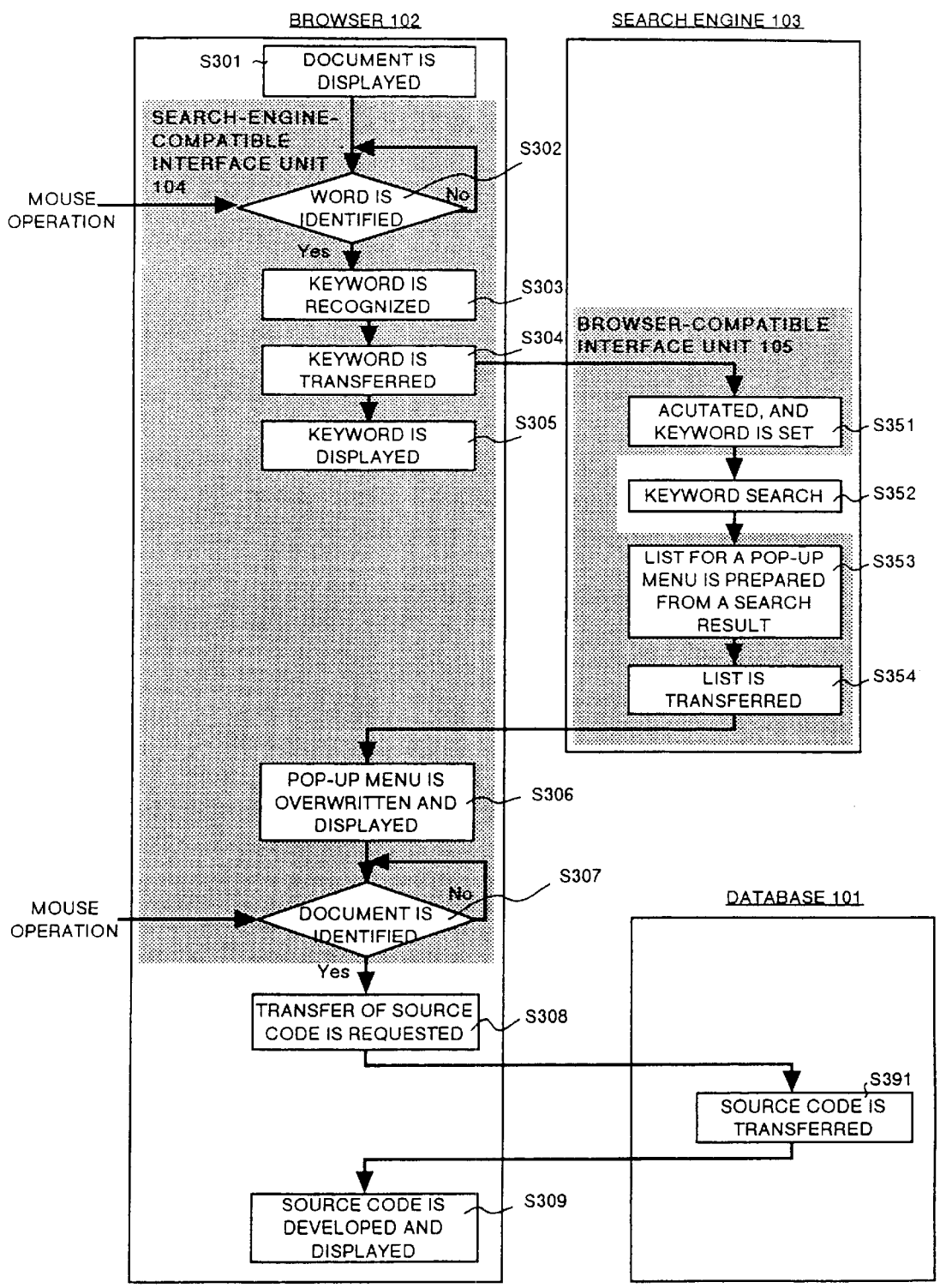
FIG. 3 is a schematic flow chart of the document information management system according to Embodiment 1.

Description is made for the operation based on the configuration described above with reference to FIG. 3. FIG. 3 shows a schematic flow chart of the document information management system according to Embodiment 1. In Embodiment 1, when a keyword is inputted through the browser 102, the browser-compatible interface unit 105 actuates the search engine 103, and a search with the keyword is started.

At first, the browser 102 displays a document on the screen (S301). The search-engine-compatible interface unit 104 starts its operation in this state.

When a word is identified (specified) through a mouse operation of the terminal unit 202 (S302), the search-engine-compatible interface unit 104 recognizes the word as a keyword (S303), transfers the keyword to the search engine 103 (S304), and displays the recognized keyword (S305). Identification (specification) of a word herein is performed, for example, by clicking the second mouse button in order to differentiate the above processing from processing of the hypertext document. The keyword is provided in a reverse video or is underlined so that it can be discriminated from other words.

On the other hand, when the browser-compatible interface unit 105 of the search engine 103 receives a keyword from the search-engine-compatible interface unit 104 of the browser 102 it actuates the search engine 103 and sets the keyword in a keyword-entry item of the search engine 103 (S351). Herein, the browser-compatible interface unit 105, although it is a part of the application for the search engine 103, always stays resident on the terminal unit 203 and also plays a role as a trigger to actuate the main system of the search engine 103 when the keyword is transferred from the search engine 103.

when the keyword is set in step S351, the search engine 103 executes a search operation with the set keyword (S352). It should be noted that the search with the keyword in this case is performed based on the assumption that an object to be searched by the search engine 103 (the database 101 to be searched) is previously set and specified. Therefore, a search can be performed across all the databases 101 connected to the network Net as objects to be searched through setting or specification thereof, and can also be performed across only a particular database 101 as an object to be searched. Setting and specification of the database 101 as an object to be searched may be carried out with the browser 102 although it is not mentioned herein.

Then, the browser-compatible interface unit 105 prepares a list for a pop-up menu from a search result with the keyword (S353), and transfers the prepared list to the browser 102 (S354). It should be noted that document names having been searched and URLs (addresses) for those documents are described on the list.

When the search-engine-compatible interface unit 104 of the browser 102 receives a list from the browser-compatible interface unit 105 it develops the list to a hypertext and overwrites (displays) the list in a space adjacent to the keyword of the original document as a pop-up menu (S306). It should be noted that FIG. 4 shows a display example of a pop-up menu 402 appearing on the screen 401 of the browser 102.

Figure 4:
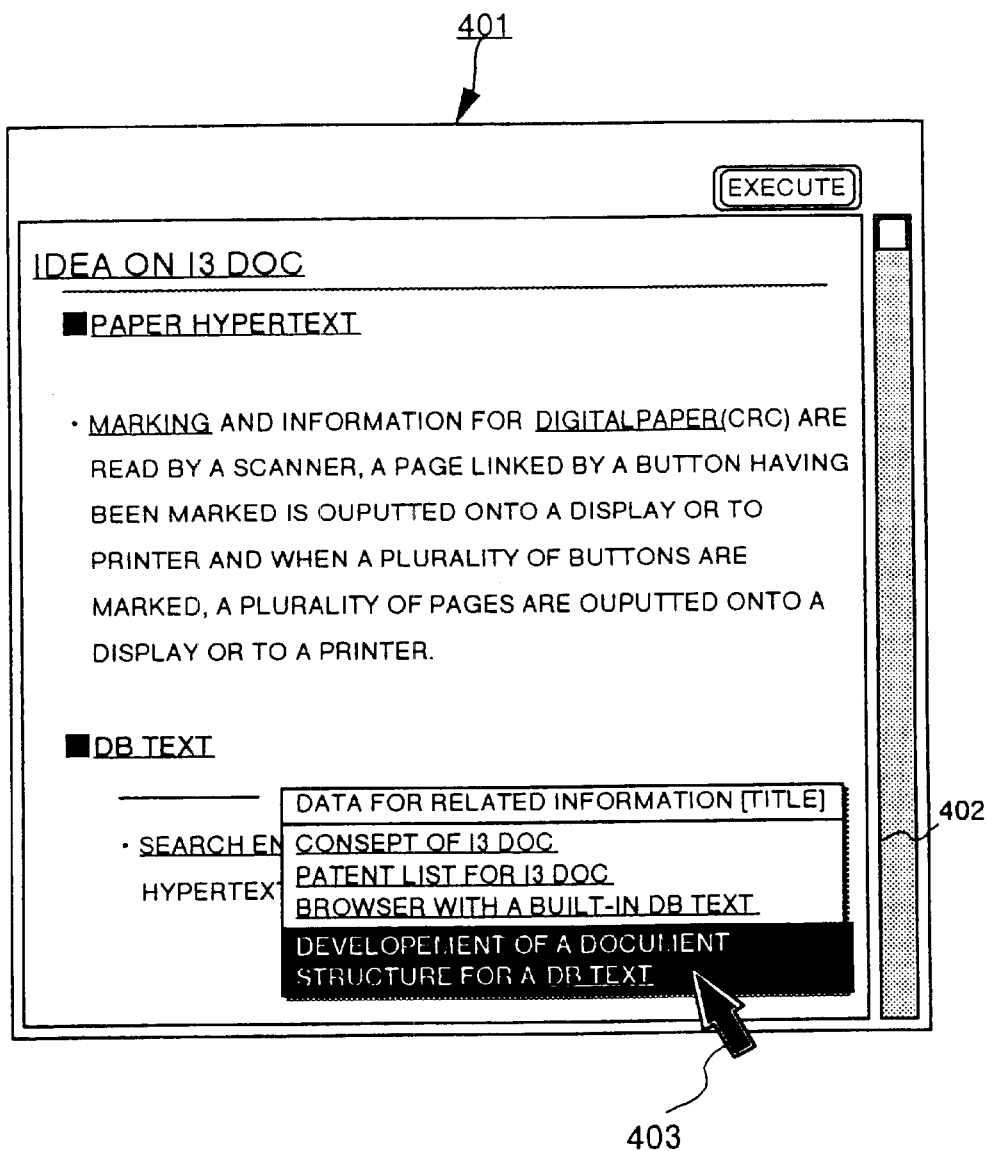
FIG. 4 is an explanatory view showing a display example of a pop-up menu according to Embodiment 1.

When the user identifies a desired document out of the pop-up menu as indicated by the cursor 403 in FIG. 4 through the mouse operation, the search-engine-compatible interface unit 104 notifies the URL (identification of the document) of the corresponding document described on the list to the browser 102 (S307). The browser 102 accesses the database 101 (Web server 201) with a document in the linked address stored therein according to the URL, and requests the database 101 to transfer the source code of the corresponding document (S308).

The database 101 having received the request from the browser 102 to transfer the source code transfers the source code of the corresponding document to the browser 102 (S391).

The browser 102 after receiving the source code develops the code to a hypertext document or a non-hypertext document (application document), and displays either of the documents on the screen (S309).

In accordance with Embodiment 1 as described above, a search is performed by using a word which is not linked to other documents as a keyword by clicking on the word, and it is possible to jump from the clicked word to a page as an object to be searched, which is just like the operation with a button of a hypertext. Therefore, it is possible to enhance convenience in document information management as well as in a document search, improve operability of a keyword search, and further promote workability when a search is performed through a hypertext. In other words, it is possible to use a document displayed on the screen of a browser 102 as a front end of the search engine 103 and display a search result by the search engine 103 on the screen of the browser 102.

It should be noted that the browser-compatible interface unit 105 can be realized by rewriting API (Application Programming Interface) of the existing search engine 103. Also, a search-engine-compatible interface unit 104 of the browser 102 can be realized by being added to the existing browser as plug-in software.

The document information management system according to Embodiment 2 is an example having the same effect as that of Embodiment 1 in which the existing search engine 103 not having a browser-compatible interface unit 105 is used. Namely, in the document information management system according to Embodiment 1, the browser 102 has the search-engine-compatible interface unit 104 and the search engine 103 has the browser-compatible interface unit 105, through which the document appearing on the screen of the browser 102 is usable as a front end of the search engine 103, but in Embodiment 2, by expanding the function of the search-engine-compatible interface unit 104 of the browser 103, the existing search engine 103 without a browser-compatible interface unit 105 incorporated therein can be used.

It should be noted that an example of basic hardware configuration is the same as that in Embodiment 1, so that description is made herein only for the different sections.

Figure 5:
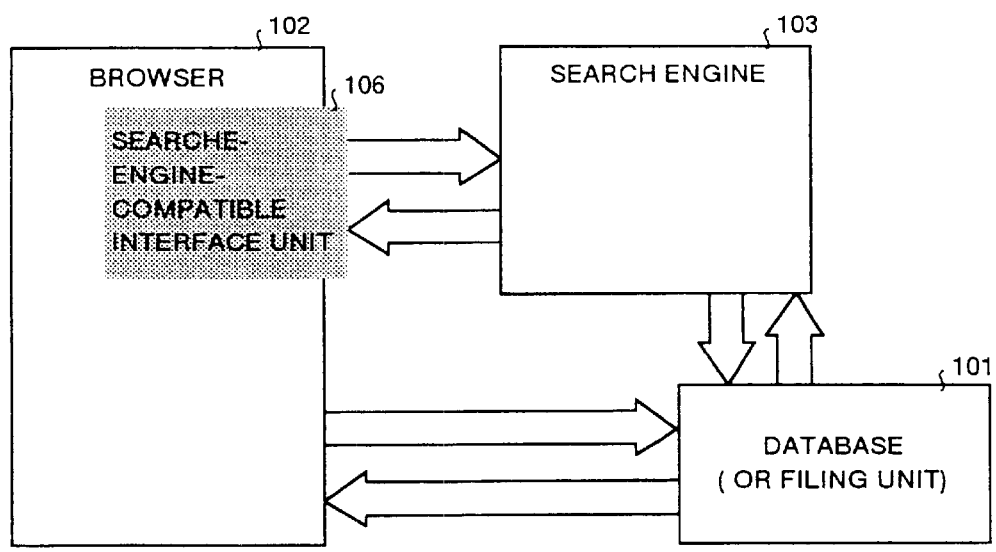
FIG. 5 is a view showing a document information management system according to Embodiment 2 of the present invention represented in the claim.

FIG. 5 shows a the document information management system according to Embodiment 2 represented in the claim which comprises at least one database or a filing unit (described only the database hereinafter to make description simpler) 101 for storing therein a plurality of document files comprising a hypertext document written in a hypertext language such as HTML and/or a non-hypertext document prepared with an application such as word processor, a browser 102 having a browsing function for displaying and operating the hypertext document and non-hypertext document on a screen, and a search engine 103 having a search-engine function of searching for a corresponding document through the database 101 according to a specified keyword.

It should be noted that the browser 102 has a search-engine-compatible interface unit 106 for specifying a word in a document displayed on the screen, actuating the search engine 103 to make the engine perform a search with the specified word as a keyword to be used in the search engine 103, receiving a result of the search from the search engine 103, and displaying the search result on the screen.

Figure 6:
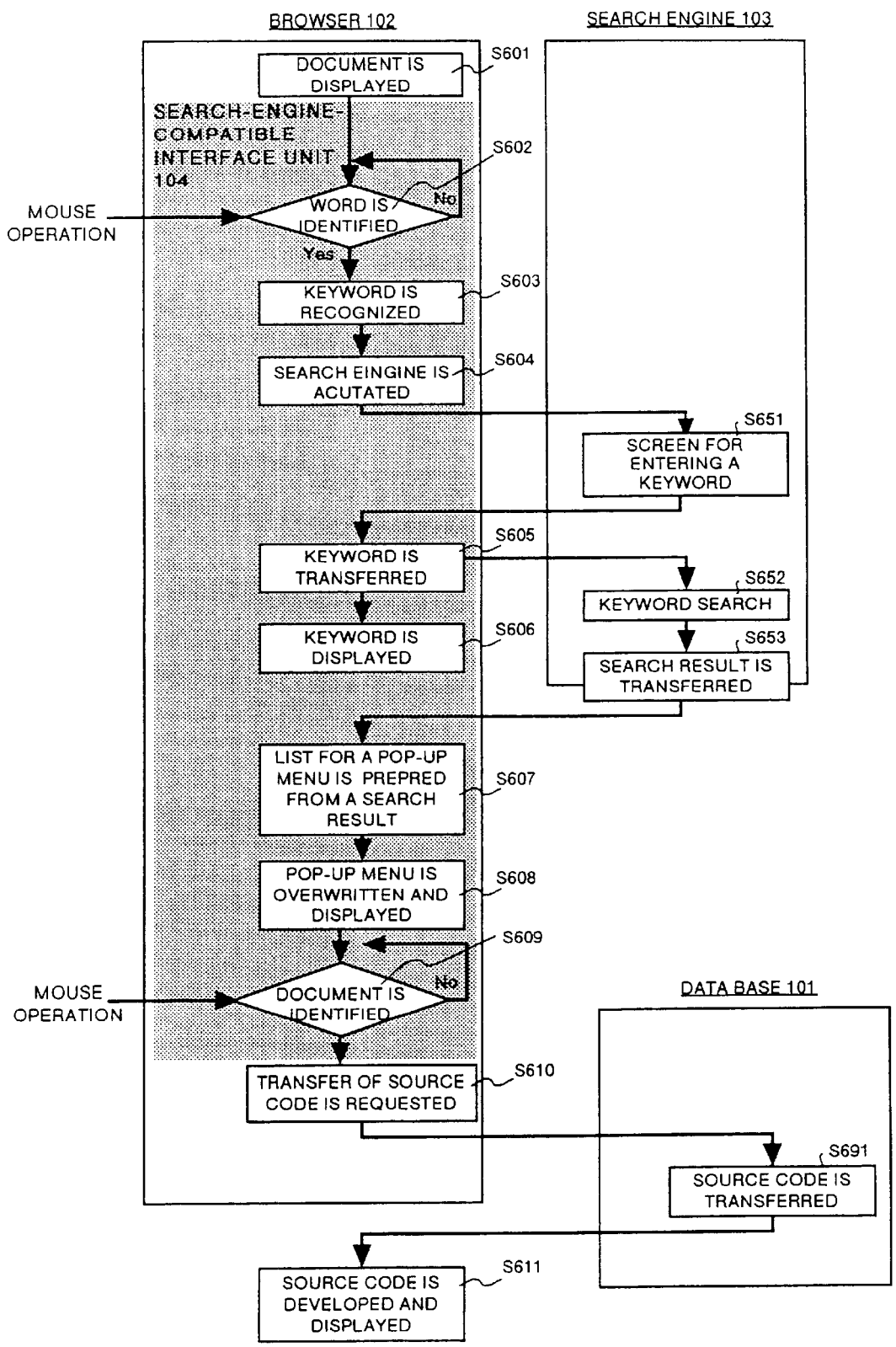
FIG. 6 is a schematic flow chart of the document information management system according to Embodiment 2.

Description is made for the operation based on the configuration described above with reference to FIG. 6. FIG. 6 shows a schematic flow chart of the document information management system according to Embodiment 2. In Embodiment 2, when receiving a keyword, the browser 102 actuates the search engine 103, and a search with the keyword is started.

At first, the browser 102 displays a document on the screen (S601). The search-engine-compatible interface unit 106 starts its operation in this state.

When a word is identified (specified) through a mouse operation of the terminal unit 202 (S602), the search-engine-compatible interface unit 106 recognizes the word as a keyword (S603), and actuates the search engine 103 (S604). Herein, the actuated search engine 103 transfers a screen for entering a keyword to the search-engine-compatible interface unit 106 as processing executable on the system (S651).

Even if the search-engine-compatible interface unit 106 receives the keyword entering screen from the search engine 103 it does not display this screen (namely, the processing of displaying the screen is skipped), but transfers the keyword recognized in step S603 to the search engine 103 (S605), and displays the recognized keyword on the screen (S606). Identification (specification) of a word herein is performed, for example, by clicking the second mouse button in order to differentiate the above processing from processing of the hypertext document. The keyword is provided in a reverse video or is underlined so that it can be discriminated from other words.

On the other hand, when the search engine 103 receives a keyword from the search-engine-compatible interface unit 106 it performs the processing of a search with the received keyword (S652). It should be noted that the search with the keyword in this case is performed based on the assumption that an object to be searched by the search engine 103 (the database 101) is previously set and specified. Therefore, a search can be performed across all the databases 101 connected to the network Net as objects to be searched through setting or specification thereof, and can also be performed across only a particular database 101 as an object to be searched. Setting and specification of the database 101 as an object to be searched may be carried out with the browser 102 although it is not mentioned herein.

Then the search engine 103 transfers a result of the search to the search-engine-compatible interface unit 106 (S653).

While the search-engine-compatible interface unit 106 cuts out, when receiving the keyword-search result, the button from the search result to prepare a list for a pop-up menu (S607), develops the list to a hypertext, and overwrites (displays) the list in a space adjacent to the keyword of the original document as a pop-up menu (S608).

When the user identifies a desired document out of the pop-up menu through the mouse operation, the search-engine-compatible interface unit 106 notifies the URL (identification of the document) of the corresponding document described on the list to the browser 102 (S609). The browser 102 accesses the database 101 (Web server 201) with a document in the linked address stored therein according to the URL, and requests the database 101 to transfer the source code of the corresponding document (S610).

The database 101 having received the request from the browser 102 to transfer the source code transfers the source code of the corresponding document to the browser 102 (S691).

When the browser 102 receives the source code it develops the code to a hypertext document or a non-hypertext document (application document), and displays either of the documents on the screen (S611).

In accordance with Embodiment 2 as described above, in addition to the same effect as that in Embodiment 1, the existing search engine 103 can be used as it is, which makes it easy to apply the invention to the existing system, and the convenience of use can further be improved.

In the document information management system according to Embodiment 3, a document file for a document displayed on the screen and used for specifying a keyword by the browser has a word table prepared by previously cutting out words included in the document file. The search-engine-compatible interface unit selects in the document displayed on the screen a plurality of expanded character strings each obtained by adding characters or character strings before and behind a character pointed by a cursor thereto, compares the selected strings to the words in the word table added to the document to evaluate the strings, and identifies an optimal word which can be assumed as the one being pointed by the cursor as a keyword to be used in the search engine.

The document information management system according to the present invention requires a function of identifying a word specified in the browser (search-engine-compatible interface unit), but this function of identifying a word can be realized in various methods, so that, a method is not particularly defined in Embodiment 1 and Embodiment 2. Therefore, in Embodiment 3, the function of identifying a word preferable to the document information management system is explained concretely.

It should be noted that the basic configuration and the operation thereof are the same as those in Embodiment 1, so that detailed description is made herein only for the different sections.

By the way, it is not easy to identify a word in a document such as the one written in Japanese. In such a case the method of identifying a word includes a method of preparing a particular document structure previously produced according to a use and a method of using an existing document structure. Herein, the document structure for the browser 102 of the document information management system according to the present invention makes it easy to identify a word by using a document (a hypertext document or a non-hypertext document) having a word table prepared by previously cutting out words included in a document file.

Added to a document file handled in the document information management system according to Embodiment 3 is a word table prepared by previously cutting out words in a document file. When a global search is to be performed across any document in Japanese, Chinese, or Korean language as an object to be searched, an index file such as a character element table and a word table is added to the document to be searched. Therefore, all of the documents handled in the system has a word table added thereto respectively, and this word table functions as a word table used for identifying a word in the document on the screen of the browser 102 and functions as an index file used for a global search in the document to be searched.

The preparation of the word table will be carried out as follows with terminal units 202, 203 and a Web server 201 connected to the network Net.

At first, words are cut out of a document registered anew by using a technique such as morpheme analysis at the point of time when a prepared document is registered or during the time zone such as night time when the document information management system is not used, then, a word table is prepared with the cut-out words, and the word table is added to the original document file, and the rewritten data is registered.

The processing as described above is always carried out, which allows word tables to be added to all the document files existing in the document information management system according to Embodiment 3.

Figure 7:
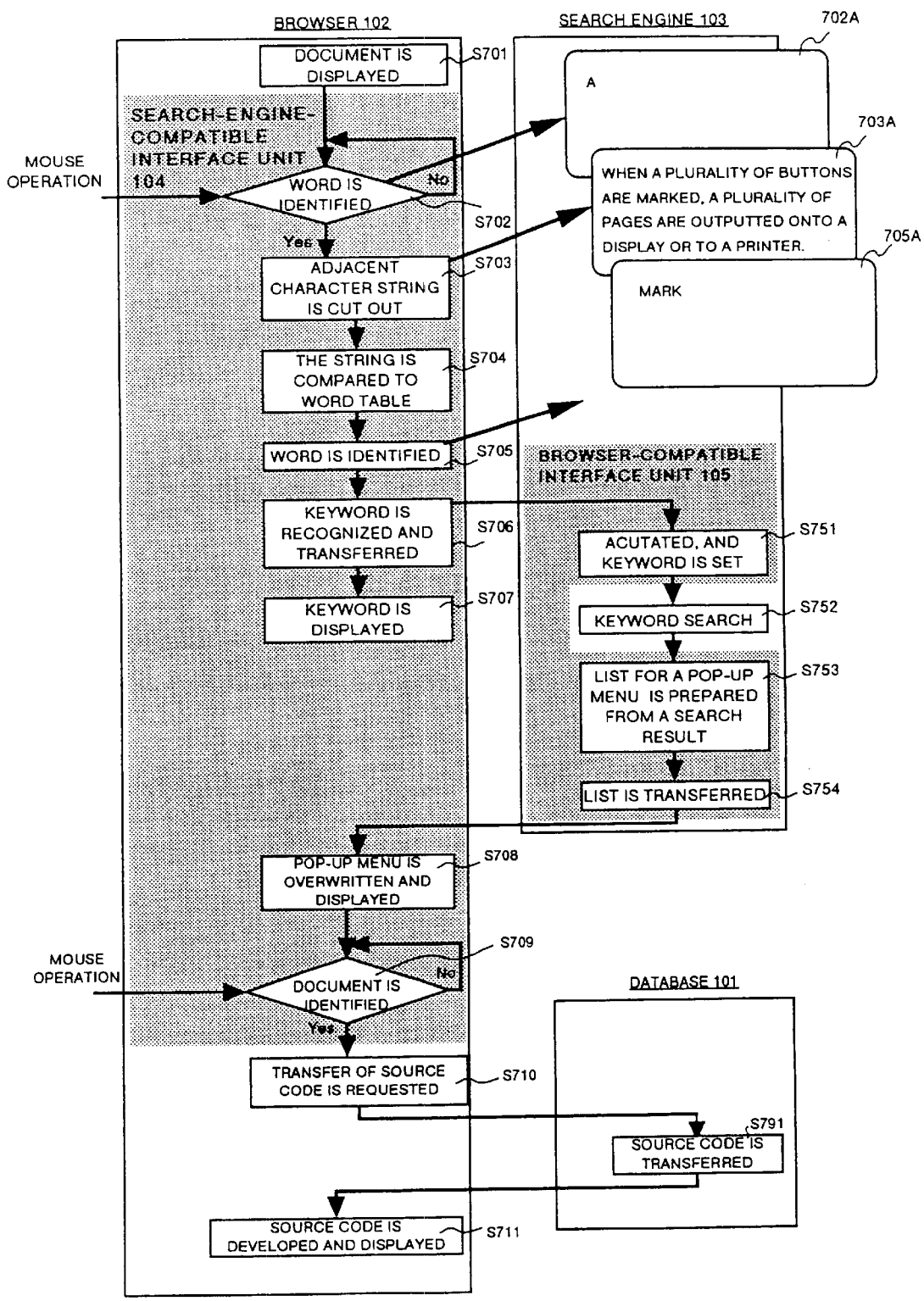
FIG. 7 is a schematic flow chart of a document information management system according to Embodiment 3.

Description is made for the operation based on the configuration described above with reference to FIG. 7. FIG. 7 shows a schematic flow chart of the document information management system according to Embodiment 3. In Embodiment 3, when a keyword is identified by the browser 102, the browser-compatible interface unit 105 actuates the search engine 103, and a search with the keyword is started.

At first, the browser 102 displays a document on the screen (S701). The search-engine-compatible interface unit 104 starts its operation in this state.

When a character is identified (specified) through a mouse operation of the terminal unit 202 (S702), the search-engine-compatible interface unit 104 cuts out a character string obtained by adding some characters before and after the character thereto (adjacent character string) (S703), compares the cut-out character string to the word table (S704), cuts out the character string coincident with any word in the word table as a word, and identifies the word (S705).

Figure 8:
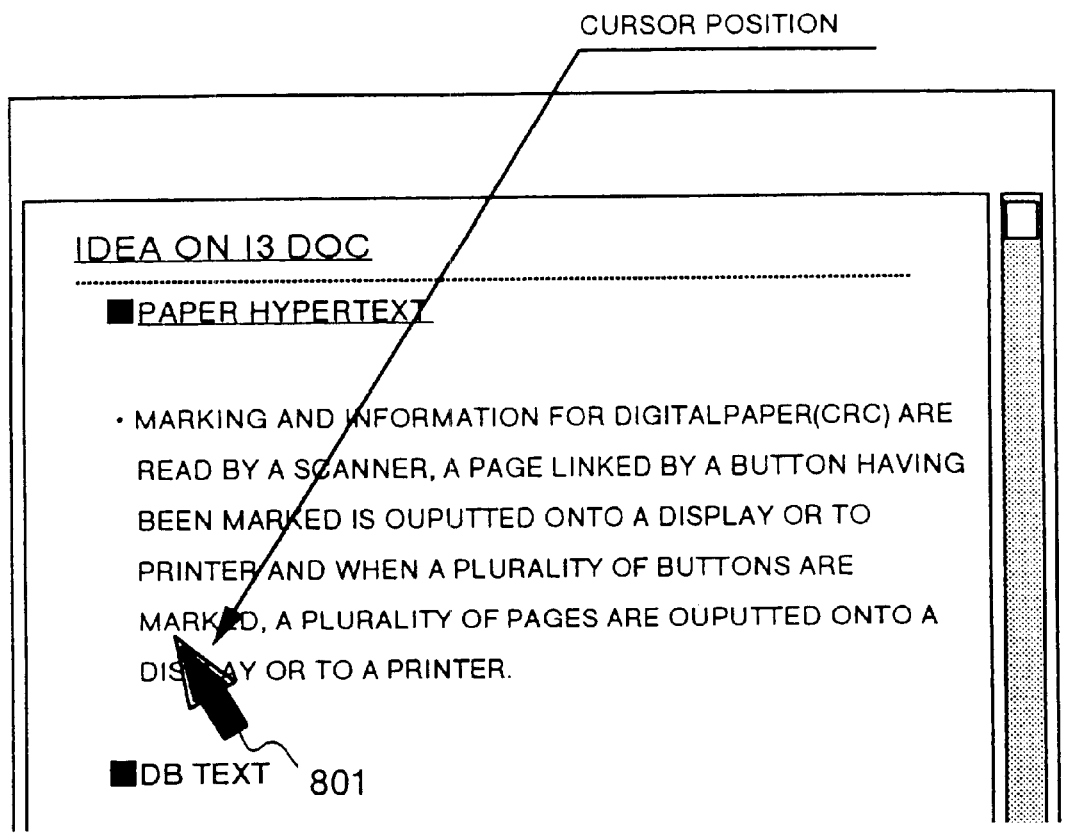
FIG. 8 is an explanatory view showing a concrete example of processing in steps S702 to S705 of FIG. 7.

Herein, a concrete example of processing in steps S702 to S705 is shown with reference to FIG. 8. As shown in FIG. 8, for example, a cursor 801 is moved to an arbitrary character (herein a character "A" in the word "MARKED") in the document displayed on the screen, a mouse button is clicked, and the character (character "A") at the position of the cursor is specified. The character at the position of the cursor specified as described above is identified as an identified character 702A in step S702 (Refer to FIG. 7). It should be noted that identification of a word herein is performed, for example, by clicking the second mouse button in order to differentiate the above processing from processing of the hypertext document.

Then, a character string obtained by adding some characters before and after the identified character thereto (adjacent character string) is cut out. It is conceivable that there are various methods as the method of cutting out a character, but there is the simplest one in which punctuation marks before and after an identified character are decided as identifiers and a character string between the punctuation marks can be cut out as an adjacent character string. In this case, the adjacent character string cut-out in step S703 is as follows: "when a plurality of buttons are marked a plurality of pages are outputted onto the display or to the printer." as indicated by the reference numeral 703A in FIG. 7.

Then, the adjacent character string is compared with the words in the word table, and the character string coincident with any word in the word table is cut out as a word, and the word is identified. This identification of a word can be carried out as follows.

1) A character string "MA" obtained by adding one character before the specified character "A" is decided as a temporary word, and comparison is made as to whether there is any word coinciding with this temporary word in the word table or not, and when it is determined that there is a coinciding word in the word table, the temporary word is identified as a word.

2) When it is determined that there is no coinciding word in the word table, a character string "AR" obtained by adding one character behind the specified character "A" is decided as a temporary word, and comparison is made as to whether there is any word coinciding with this temporary word in the word table or not, and when it is determined that there is the coinciding word, the temporary word is identified as a word.

3) When it is determined that there is no coinciding word therein, a character string "MAR" obtained by adding one character before and after the specified character "A" is decided as a temporary word, and comparison is made as to whether there is any word coinciding with this temporary word in the word table or not, and when it is determined that there is the coincident word therein, the temporary word is identified as a word.

Thereafter and on, characters are added in the same manner as described above, and the processing is repeated until the cut-out character string is coincident with any word in the word table or until 'the cut-out character string' becomes the same as 'the adjacent character string'.

Herein, a word "MARK" is identified as indicated by the reference numeral 705A in FIG. 7 during the identification of a word in step S705.

In English language the words in a sentence are separated by a space, so that a character string sandwiched between spaces can without difficulty be considered as a word. However, in languages like Japanese, Chinese or Korean, words in a sentence are not separated by space as in English. Therefore, in the documents written in these languages, it is difficult to decide where a word starts and where it ends in a sentence. In the above described method, a character is added before or behind a specified character, so that, a stage is reached when a word having a meaning is formed and the word coincides with a word in the word table. Though an English language document is shown in FIG. 8 for simplification in explanation, this method is more effective for extracting a word from the documents written in Japanese, Chinese or Korean languages.

Figure 9:
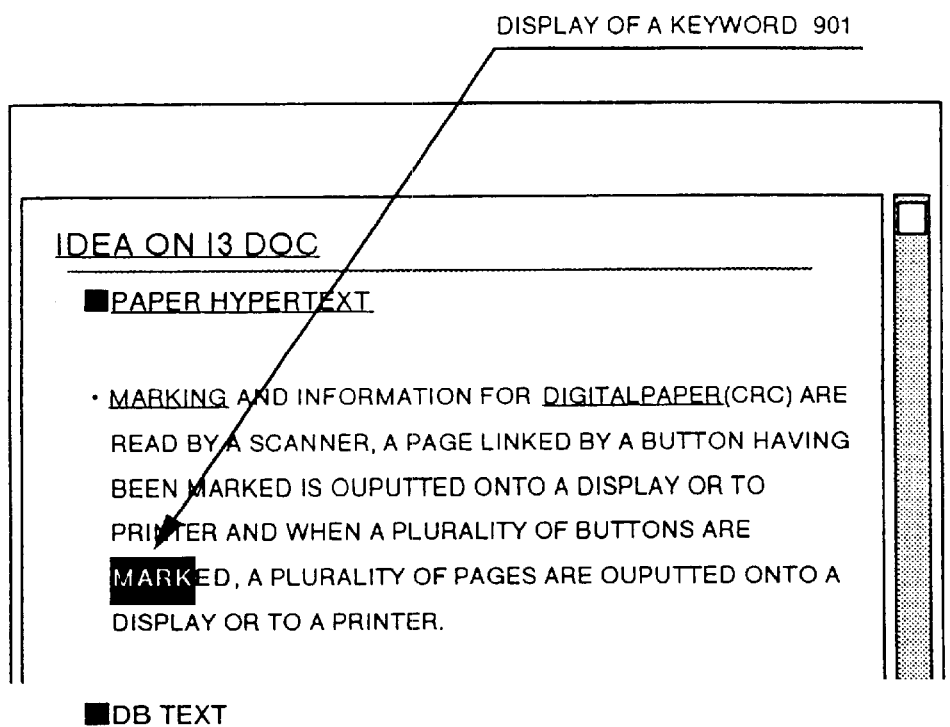
FIG. 9 is an explanatory view showing a display example of a keyword according to Embodiment 3.

The identified word "MARK" is recognized as a keyword in step S706 of FIG. 7, and the keyword is transferred to the search engine 103. The recognized keyword is also displayed on the screen in step S707. FIG. 9 shows an example of display of a keyword. The keyword is provided in a reverse video or is underlined so that it can be distinguished from other words.

On the other hand, when the browser-compatible interface unit 105 of the search engine 103 receives the keyword from the search-engine-compatible interface unit 104 of the browser 102 it actuates the search engine 103 and sets the keyword in a keyword-entry item of the search engine 103 (S751). Herein, the browser-compatible interface unit 105, although it is a part of the application for the search engine 103, always stays resident on the terminal unit 203 and also plays a role as a trigger to actuate the main system of the search engine 103 when the keyword is transferred from the search engine 103.

When the keyword is set in step S751, the search engine 103 executes a search operation with the set keyword (S752).

Then, the browser-compatible interface unit 105 prepares a list for a pop-up menu from a search result with the keyword (S753), and transfers the prepared list to the browser 102 (S754). It should be noted that document names having been searched and URLs (addresses) for those documents are described in this list.

When the search-engine-compatible interface unit 104 of the browser 102 receives a list from the browser-compatible interface unit 105 it develops the list to a hypertext and overwrites (displays) the list in a space adjacent to the keyword of the original document as a pop-up menu (S708).

When the user identifies a desired document out of the pop-up menu through the mouse operation, the search-engine-compatible interface unit 104 notifies the URL (identification of the document) of the corresponding document described in the list to the browser 102 (S709). The browser 102 accesses the database 101 (Web server 201) with a document in the linked address stored therein according to the URL, and requests the database 101 to transfer the source code of the corresponding document (S710).

The database 101 having received the request from the browser 102 to transfer the source code transfers the source code of the corresponding document to the browser 102 (S791).

When the browser 102 receives the source code it develops the code to a hypertext document or a non-hypertext document (application document), and displays either of the documents on the screen (S711).

In accordance with Embodiment 3 as described above, in addition to the same effect as that in Embodiment 1, a document file has a word table prepared by previously cutting out words included in the document file, and the search-engine-compatible interface unit selects, in the document displayed on the screen, a plurality of expanded character strings each obtained by adding characters or character strings before and after a character pointed by a cursor thereto, compares the selected strings to the words in the word table to evaluate the strings, and identifies an optimal word which can be assumed as the one being pointed by the cursor as a keyword to be used in the search engine, therefore a word as a keyword can accurately and efficiently be identified.

The document information management system according to Embodiment 4 concretely shows another example of a function for identifying a word preferable to the document information management system according to the present invention. It should be noted that the basic configuration and the operation thereof are the same as those in Embodiment 1, so that detailed description is made herein only for the different sections.

In the document information management system according to Embodiment 4, a hypertext document handled in the system has a dummy button obtained by previously cutting out a word included in the document and setting a target for linking the word thereto as particular address information for responding to actuation of the search engine provided therein. Further, the search-engine-compatible interface unit identifies, when the dummy button is pointed by the cursor, a word corresponding to the dummy button as a keyword to be used in the search engine, and also actuates the search engine according to the URL for the dummy button.

Thus, the hypertext document handled in Embodiment 4 has a previously set dummy button. It should be noted that any word having been set as an ordinary button in a hypertext document is not set as a dummy button, but all the main words other than the button therein are set as dummy buttons. A linked URL of this dummy button is set in the search engine 103 or in a common particular URL.

The setting and preparation of this dummy button is carried out as follows with terminal units 202, 203 and the Web server 201 connected to a network Net. At first, a word is cut out of a document registered anew by using a technique such as morpheme analysis at the point of time when a prepared document is registered or during the time zone such as night time when the document information management system is not used, then, the cut-out word is identified as a dummy button, the linked URL thereof is set, the dummy button is added to the original document file, and the rewritten data is registered.

The processing as described above is always carried out, which allows dummy buttons to be added to all the hypertext documents existing in the document information management system according to Embodiment 4.

Description is made for the operation based on the configuration described above with reference to FIG. 10. FIG. 10 shows a schematic flow chart of the document information management system according to Embodiment 4. In Embodiment 4, when a dummy button is identified by the browser 102, the browser-compatible interface unit 105 actuates the search engine 103, and a search with the keyword is started.

At first, the browser 102 displays a document on the screen (S1001). The search-engine-compatible interface unit 104 starts its operation in this state.

When a dummy button is identified (specified) through a mouse operation of the terminal unit 202 (S1002), the search-engine-compatible interface unit 104 accesses to the linked URL set in the dummy button (S1003), transfers the character string (word) for the dummy button to the linked location as a keyword (S1004), and displays the identified dummy button (keyword) on the screen (S1005). It should be noted that a keyword is provided in a reverse video or is underlined so that it can be distinguished from the button and other words in a hypertext.

On the other hand, when the access is made from the search-engine-compatible interface unit 104 of the browser 102 in step S1003, the browser-compatible interface unit 105 of the search engine 103 actuates the search engine 103 (S1051), recognizes the keyword when it receives the keyword from the search-engine-compatible interface unit 104 in step S1004 and sets the keyword in a keyword-entry item of the search engine 103 (S1052). Herein, the browser-compatible interface unit 105, although it is a part of the application for the search engine 103, always stays resident on the terminal unit 203 and also plays a role as a trigger to actuate the main system of the search engine 103 when the keyword is transferred from the search engine 103.

When the keyword is set in step S1052, the search engine 103 executes a search operation with the set keyword (S1053).

Then, the browser-compatible interface unit 105 prepares a list for a pop-up menu from a search result with the keyword (S1054), and transfers the prepared list to the browser 102 (S1055). It should be noted that document names having been searched and URLs (addresses) for those documents are described in this list.

When the search-engine-compatible interface unit 104 of the browser 102 receives a list from the browser-compatible interface unit 105 it develops the list to a hypertext and overwrites (displays) the list in a space adjacent to the keyword of the original document as a pop-up menu (S1006).

When the user identifies a desired document out of the pop-up menu through the mouse operation, the search-engine-compatible interface unit 104 notifies the URL (identification of the document) of the corresponding document described in the list to the browser 102 (S1007). The browser 102 accesses the database 101 (Web server 201) with a document in the linked address stored therein according to the URL, and requests the database to transfer the source code of the corresponding document (S1008).

The database 101 having received the request from the browser 102 to transfer the source code transfers the source code of the corresponding document to the browser 102 (S1091).

When the browser 102 receives the source code it develops the code to a hypertext document or a non-hypertext document (application document), and displays either of the documents on the screen (S1009).

In accordance with Embodiment 4 as described above, in addition to the same effect as that in Embodiment 1, a hypertext document has a dummy button obtained by previously cutting out a word included in the document and setting the linked address of the word as particular address information (URL) for responding to actuation of the search engine, therefore a word as a keyword can efficiently be identified and also a search engine can easily be actuated.

Embodiment 5 shows another example of a function for identifying a word preferable to the document information management system according to the present invention, and a search engine-compatible interface unit cuts out, in a document displayed on the screen, a character string from a header character to an end character indicated by the cursor as a word, and identifies the cut-out word as a keyword to be used in the search engine. It should be noted that the basic configuration and the operation thereof are the same as those in Embodiment 1, so that description is made herein only for a method of identifying a word by the search-engine-compatible interface unit 104.

Figure 11A:
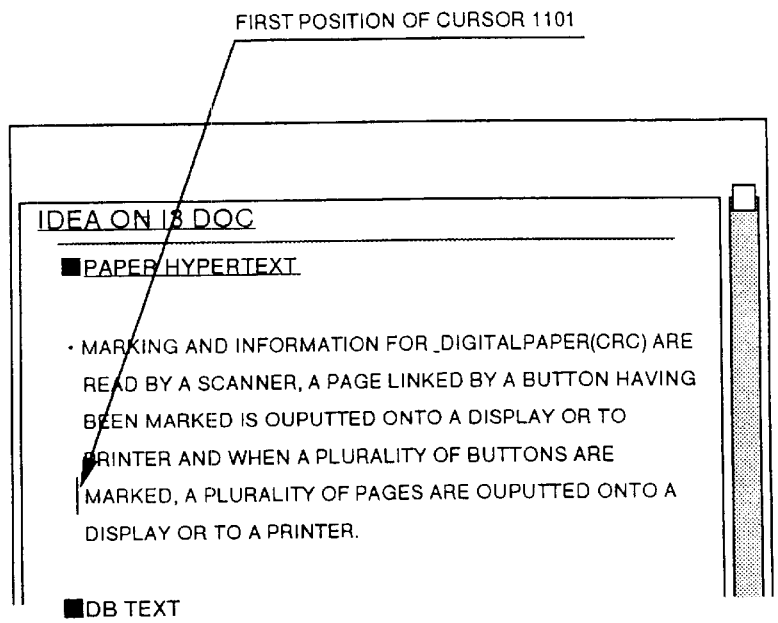
FIG. 11A and FIG. 11B are explanatory views showing how a word is identified by a search-engine-compatible interface unit according to Embodiment 5.
Figure 11B:
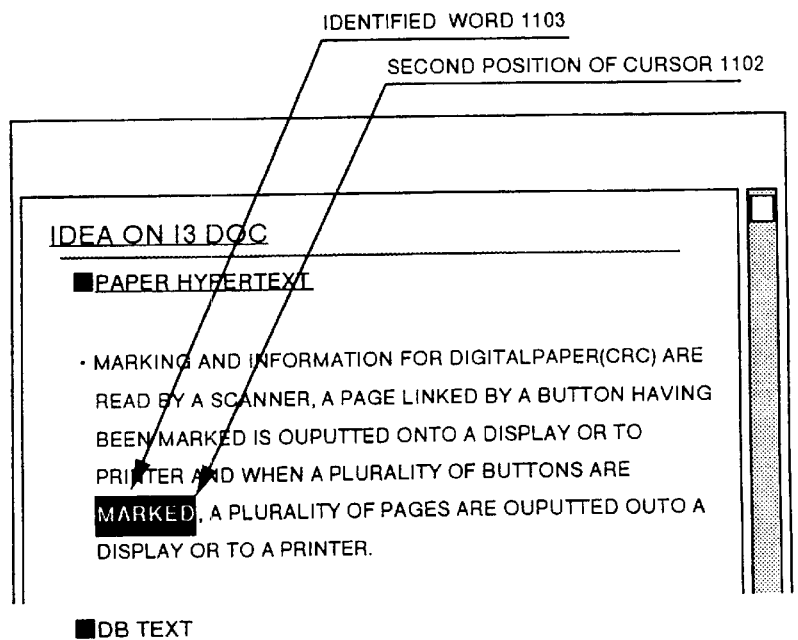

FIG. 11A and FIG. 11B are explanatory views showing how a word is identified by the search-engine-compatible interface unit 104 according to Embodiment 5. The search-engine-compatible interface unit 104 detects, as shown in FIGS. 11A and 11B, a first position 1101 and a second position 1102 of the cursor in the document on the screen of the browser 102, cuts out a character string from the character at the first position 1101 to the character at the second position 1102 as a specified word, and sets the word as an identified word 1103.

More specifically, a method of clicking ON a mouse button at the first position 1101 and clicking OFF the mouse button at the second position 1102 and a method of clicking the mouse button at the first position 1101 and again clicking the mouse button at the second position 1102 may be used. Also identification of a word is performed, for example, by clicking the second mouse button in order to differentiate the above processing from processing of the hypertext document. Further, the identified word is provided in a reverse video or is underlined.

In accordance with Embodiment 5 as described above, there is no need to have a particular document structure, therefore an existing hypertext document or a non-hypertext document (application document) can be used as it is. In addition, a word as a keyword can efficiently be identified.

In the document information management system according to Embodiment 6, the search-engine-compatible interface unit cuts out, in the document displayed on the screen, an optimal word through evaluation of an expanded character string obtained by adding characters or character strings before and behind a character pointed by a cursor thereto by using a word cut-out technique such as morpheme analysis, and identifies the cut-out word as a keyword to be used in the search engine.

It should be noted that the basic configuration and the operation thereof are the same as the document information management system according to Embodiment 3, so that description is made herein only for the different sections.

Figure 12:
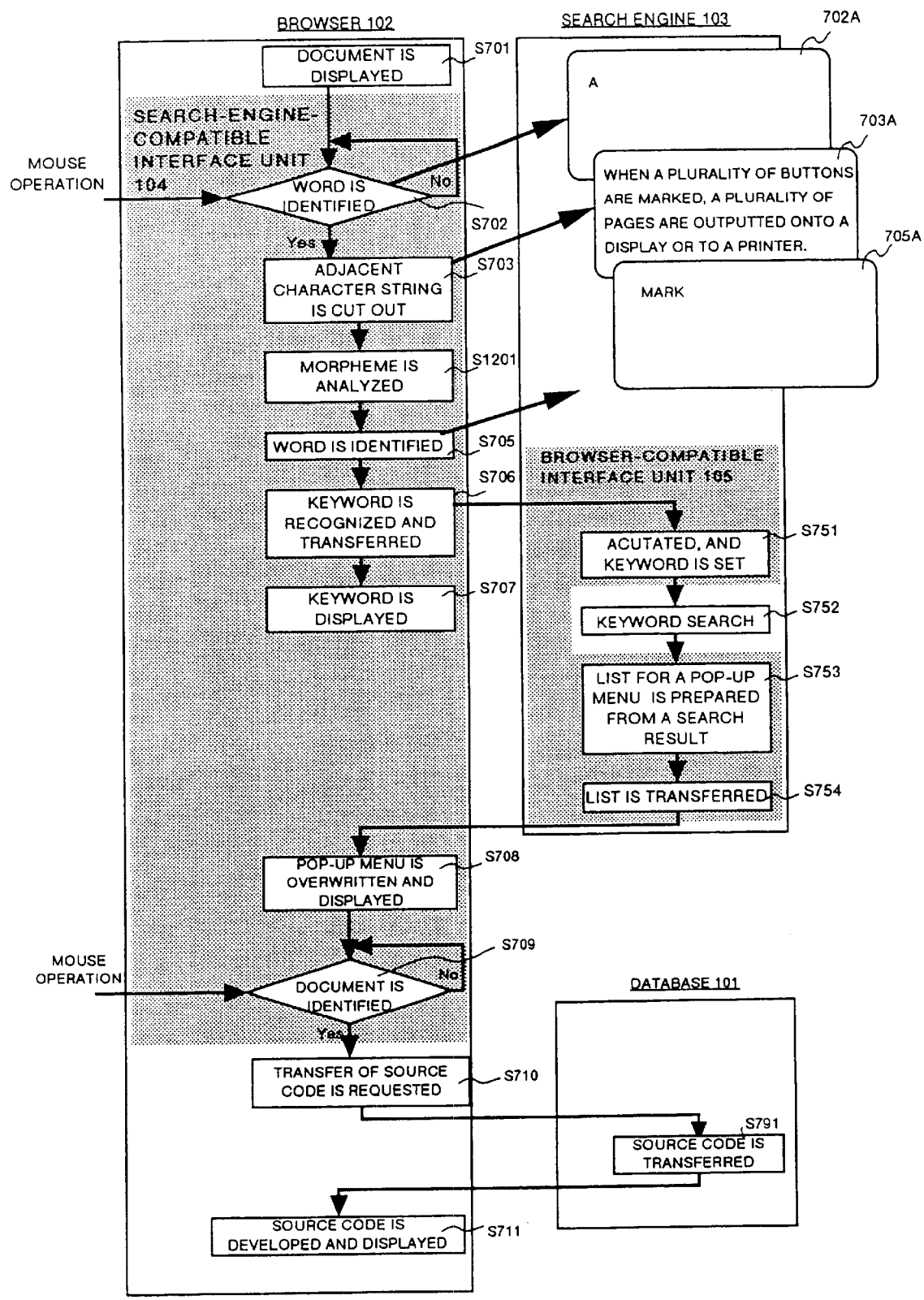
FIG. 12 is a schematic flow chart of a document information management system according to Embodiment 6.

FIG. 12 shows a schematic flow chart of the document information management system according to Embodiment 6, in which step S1201 is provided in place of step S704 of the schematic flow chart in Embodiment 3 shown in FIG. 7, and the other steps are the same as those in Embodiment 3.

When a character is identified (specified) through a mouse operation of the terminal unit 202 (S702), the search-engine-compatible interface unit 104 cuts out a character string obtained by adding some characters before and after the character thereto (adjacent character string) (S703), cuts out a word through morpheme analysis of the cut-out character string for evaluation (S1201), and identifies an optimal word (S705).

Herein, the adjacent character string cut-out in step S703 is as follows: "when a plurality of buttons are marked, a plurality of pages are outputted onto the display or to the printer." as indicated by the reference numeral 703A in FIG. 12. When this adjacent character string is subjected to the morpheme analysis, the word "MARK" can be identified as indicated by the reference numeral 705A in FIG. 12.

In accordance with Embodiment 5 as described above, the search-engine-compatible interface unit 104 cuts out an optimal word through evaluation of a character string by using a word cut-out technique such as morpheme analysis, and identifies the cut-out word as a keyword to be used in the search engine, therefore a word as a keyword can accurately and efficiently be identified.

The document information management system according to Embodiment 7 enables entry of search criteria and output criteria much more as compared to those in Embodiment 1 to Embodiment 6. It should be noted that the basic configuration is the same as that of Embodiment 1, so that description is made herein only for the different sections.

In the document information management system according to Embodiment 7, the search-engine-compatible interface unit 104 displays a menu for specifying search criteria and output criteria for the search engine 103 in a space adjacent to the specified word, and performs a search and output according to the specified word as well as to the menu items specified by the cursor.

Figure 13:
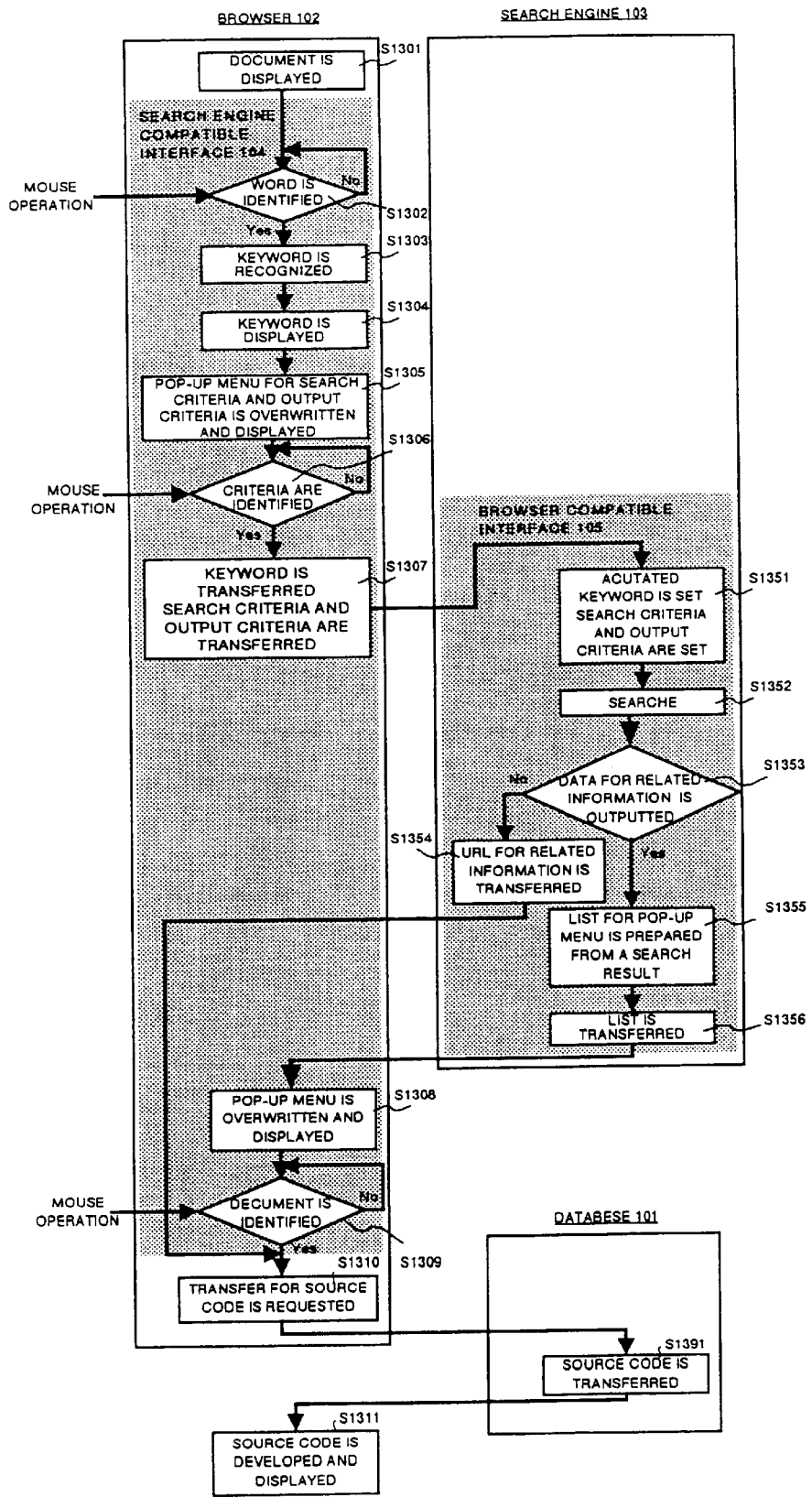
FIG. 13 is a schematic flow chart of a document information management system according to Embodiment 7.

Description is made for the operation based on the configuration described above with reference to FIG. 13. FIG. 13 shows a schematic flow chart of the document information management system according to Embodiment 7. In Embodiment 7, when a keyword is identified by the browser 102, the browser-compatible interface unit 105 actuates the search engine 103, and a search with the keyword is started.

At first, the browser 102 displays a document on the screen (S1301). The search-engine-compatible interface unit 104 starts its operation in this state.

When a word is identified (specified) through a mouse operation of the terminal unit 202 (S1302), the search-engine-compatible interface unit 104 recognizes, the word as a keyword (S1303), and displays the recognized keyword on the screen (S1304).

Figure 14:
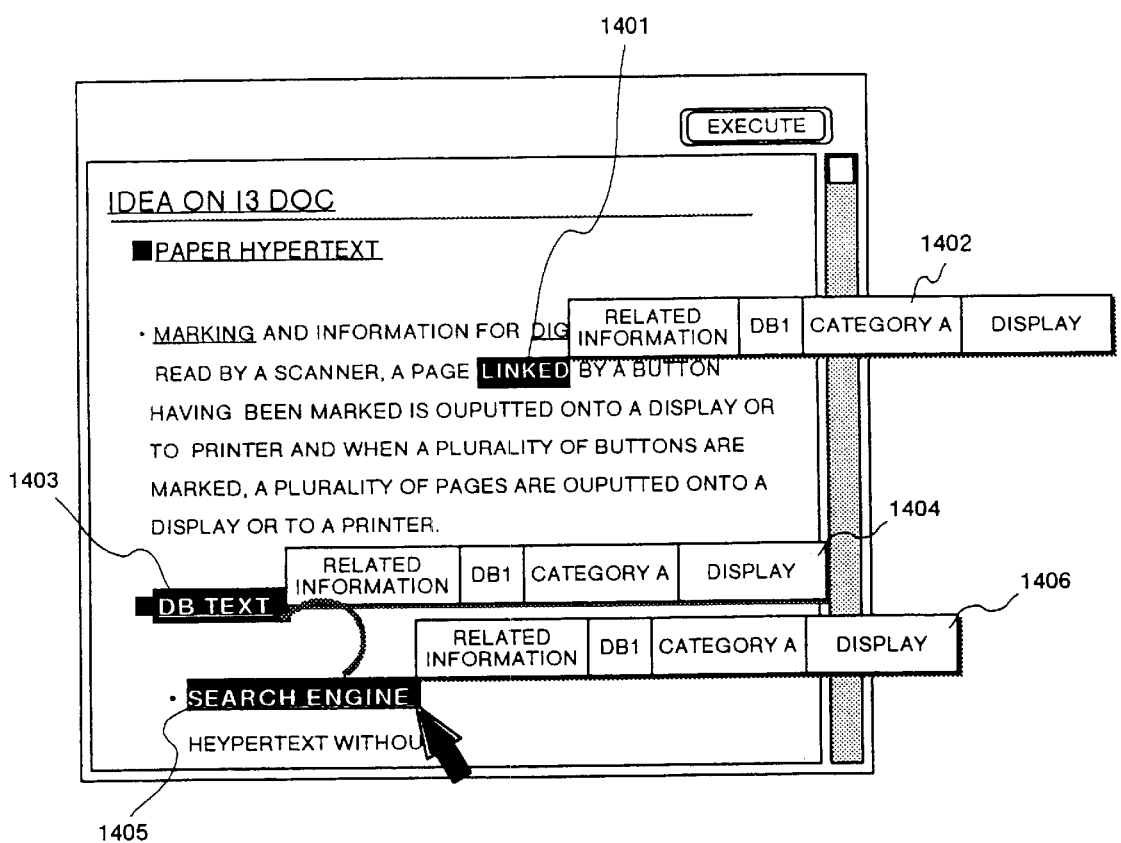
FIG. 14 is an explanatory view showing an example of how to specify (identify) search criteria and output criteria through a mouse operation in Embodiment 7.

Then, a pop-up menu for specifying search criteria as well as output criteria is overwritten and displayed adjacent to the recognized keyword (S1305). More specifically, as shown in FIG. 14, when the keyword 1401 (for example, "LINKED") is displayed, the pop-up menu for the search criteria as well as output criteria is displayed adjacent to the corresponding keyword. By clicking on a desired character on this pop-up menu (not shown), the corresponding item can be selected. In the search criteria, it is possible to specify a category and a type of DB (database to be searched), and in the output criteria, it is possible to specify output of related information and data for the related information and also specify a target to be outputted of data (a device to which the data is outputted).

When the search criteria and output criteria are identified through the mouse operation described later in step S1306, the search-engine-compatible interface unit 104 transfers the recognized keyword and the identified search criteria to the search engine 103 (S1307).

On the other hand, when the browser-compatible interface unit 105 of the search engine 103 receives a keyword from the search-engine-compatible interface unit 104 of the browser 102 it actuates the search engine 103 and sets the keyword for the search engine 103 and the search criteria as well as output criteria therein (S1351). Herein, the browser-compatible interface unit 105, although it is a part of the application for the search engine 103, always stays resident on the terminal unit 203 and also plays a role as a trigger to actuate the main system of the search engine 103 when the keyword is transferred from the search engine 103.

When the keyword and the search criteria as well as output criteria are set in step S1351, the search engine 103 executes a search operation with the set keyword and search criteria as well as output criteria (S1352).

Then, the browser-compatible interface unit 105 determines whether output of data for related information is specified as an output criterion or not (S1353). Herein, when it is determined that the output of data for related information is set, the browser-compatible interface unit 105 prepares a list for a pop-up menu from a keyword-search result (S1355), and transfers the prepared list to the browser 102 (S1356). When it is determined that the output of data for related information is not set, the browser-compatible interface unit 105 transfers only the URL for the related information to the browser 102 (S1354).

When the search-engine-compatible interface unit 104 of the browser 102 receives a list from the browser-compatible interface unit 105 it develops the list to a hypertext and overwrites (displays) the list in a space adjacent to the keyword of the original document as a pop-up menu (S1308).

When the user identifies a desired document out of the pop-up menu through the mouse operation, the search-engine-compatible interface unit 104 notifies the URL (identification of the document) of the corresponding document described in the list to the browser 102 (S1309). The browser 102 accesses the database 101 (Web server 201) with a document in the linked address stored therein according to the URL, and requests the database 101 to transfer the source code of the corresponding document (S1310). Similarly, when the browser 102 receives the URL for the related information from the browser-compatible interface unit 105 it accesses the database 101 (Web server 201) with a document in the linked address stored therein according to the URL, and requests the database 101 to transfer the source code of the corresponding document.

The database 101 having received the request from the browser 102 to transfer the source code transfers the source code of the corresponding document to the browser 102 (S1391).

When the browser 102 receives the source code it develops the code to a hypertext document or a non-hypertext document (application document), and displays either of the documents on the screen (S1311).

Next, description is made more specifically for a method of specifying (identifying) search criteria as well as output criteria through a mouse operation with reference to FIG. 14 to FIG. 18.

Specification of the search criteria as well as output criteria is performed, for example, by clicking the second mouse button in order to differentiate the above processing from processing of the hypertext document. The specified word is provided in a reverse video or is underlined.

As the search criteria, a simple search equation can be used. For example, OR search does not require a search equation while an AND search is performed through the operation described below. At first, it is assumed, as shown in FIG. 14, that the criteria indicated by the pop-up menu 1402 are set for the keyword 1401 and the criteria (default) indicated by the pop-up menu 1404 are set for the keyword 1403. In this status, the cursor is pointed to the keyword 1403 having been specified and the second mouse button is clicked ON, and the cursor is moved to the keyword 1405 which is not specified yet and the second mouse button is clicked OFF, and then an AND sign "∩" is generated over the keyword 1403 to the keyword 1405. At this point of time, the same contents as those of the pop-up menu 1404 are displayed as a pop-up menu 1406. It should be noted that only the pop-up menu 1404 may be displayed for the AND search.

As some other method, the cursor is pointed to the keyword 1403 having been specified and the second mouse button is clicked ON, and the cursor is moved to the keyword 1405 which is not specified yet and the second mouse button is clicked OFF, and then the keyword 1403 is moved to the position of the keyword 1405 and automatically returned to the original position as soon as the second mouse button is clicked OFF (drag & drop), and the AND sign "∩" is generated over the keyword 1403 to the keyword 1405. At this point of time, the same contents as those of the pop-up menu 1404 are displayed as the pop-up menu 1406.

Figure 15:
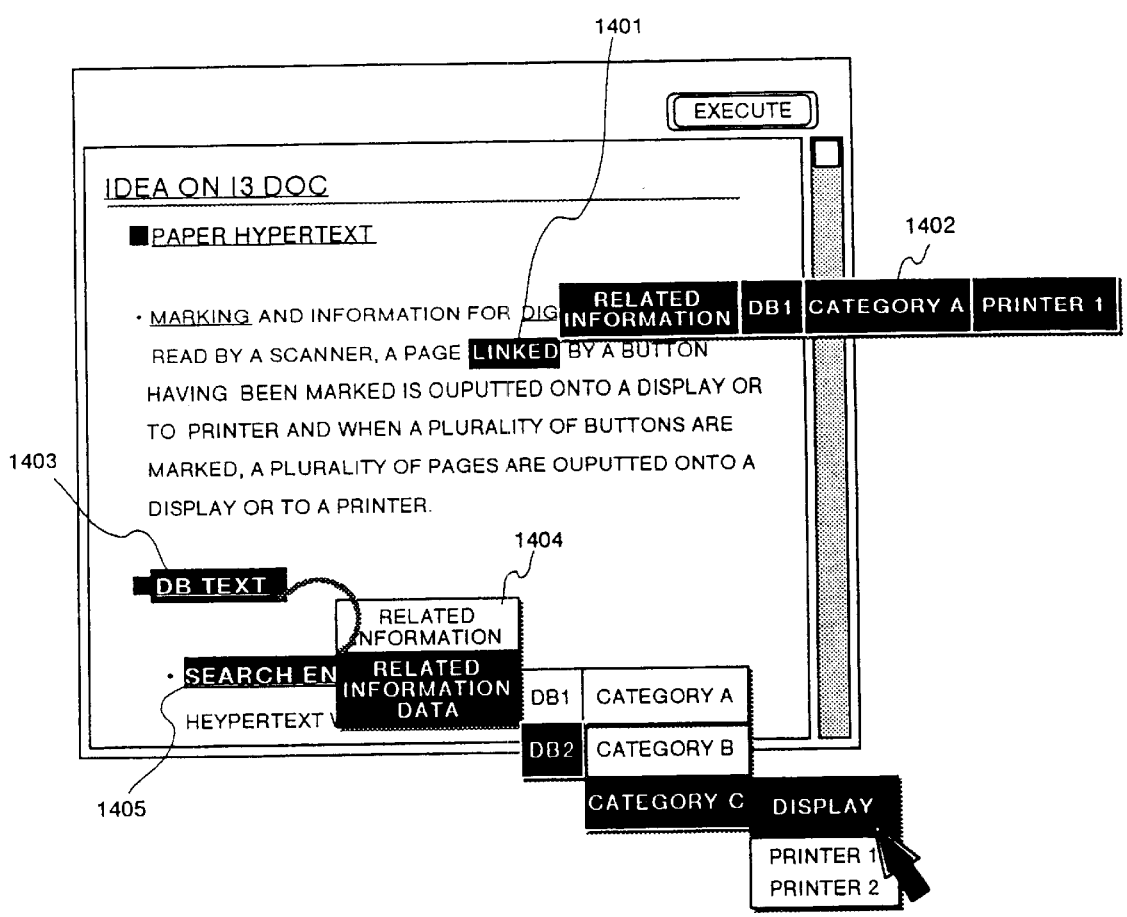
FIG. 15 is an explanatory view showing an example of how to specify (identify) search criteria and output criteria through a mouse operation in Embodiment 7.

Some other search criteria as well as output criteria are also specified by clicking thereon. For example, as shown in FIG. 15, "Related information, DB2, Category C, Display" is specified in the pop-up menu 1404 of the AND search for the keyword 1403 and keyword 1405. This specification indicates "AND of the two keywords is searched in the category C of the DB2, and the data for related information is outputted to the display (during its specification)". The specified search criteria as well as output criteria is displayed like the pop-up menu 1402 for the keyword 1401. It should be noted that the pop-up menu 1402 indicates "One keyword is searched in the category A of the database DB1, and the related information is outputted to the printer 1 (after its specification)".

When the contents of a pop-up menu (search criteria and output criteria) having been specified once is to be corrected, the cursor is pointed to the pop-up menu having been specified and the second mouse button is clicked, and then the pop-up menu is displayed again, on which specification can be carried out again.

Figure 16:
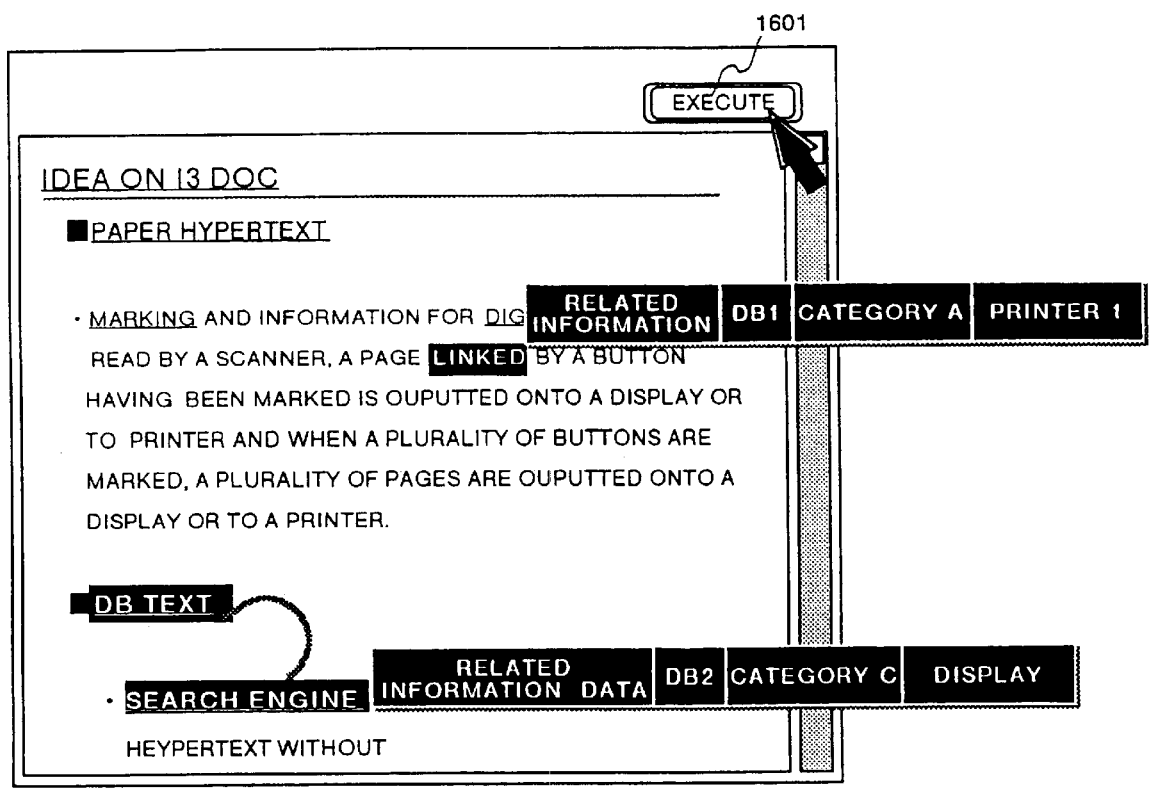
FIG. 16 is an explanatory view showing an example of how to specify (identify) search criteria and output criteria through a mouse operation in Embodiment 7.

Then, as shown in FIG. 16, when the cursor is pointed to the "EXECUTE" button 1601 on the screen and the second mouse button is clicked, execution of a search is instructed, and the criteria therefor are identified in step S1306 of FIG. 13.

Figure 17:
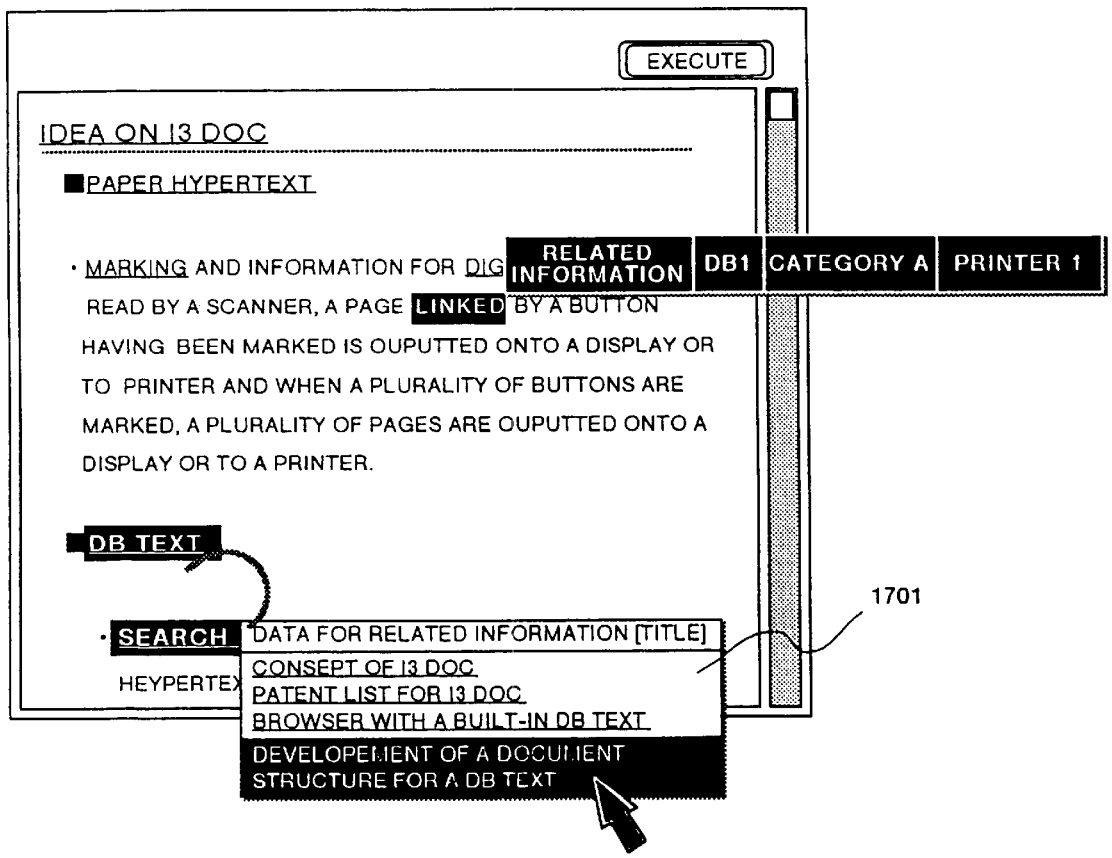
FIG. 17 is an explanatory view showing an example of how to specify (identify) search criteria and output criteria through a mouse operation in Embodiment 7.
Figure 18:
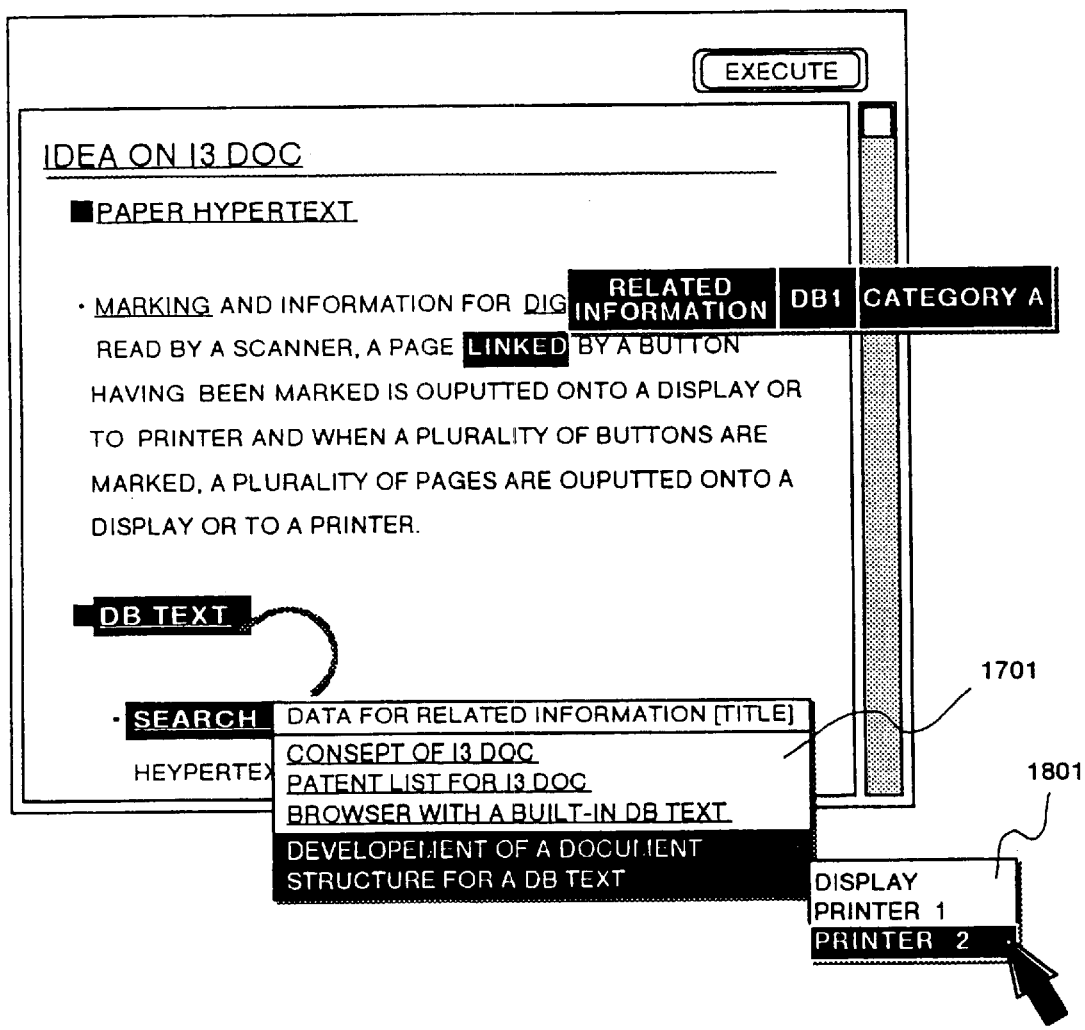
FIG. 18 is an explanatory view showing an example of how to specify (identify) search criteria and output criteria through a mouse operation in Embodiment 7.

FIG. 17 shows an example of how the mouse is operated when a target to be outputted of data for related information is to be specified. As shown in steps S1355, S1356 of FIG. 13, the browser-compatible interface unit 105 of the search engine 103 transfers a search result as a list for a pop-up menu to the search-engine-compatible interface unit 104 of the browser 102. The search-engine-compatible interface unit 104 develops the list to a hypertext, and overwrites and displays the list in a space adjacent to the original keyword as a pop-up menu 1701. The data for related information (such as a title and summary) is displayed in some space adjacent to the keyword as the pop-up menu 1701 as described above, and when the cursor is pointed to a desired data for related information on the pop-up menu 1701 and the second mouse button is clicked thereon, a pop-up menu 1801 for output criteria is displayed as shown in FIG. 18. A target to be outputted (printer 2 herein) of data can be specified by pointing the cursor to an item for the output criteria and clicking the second mouse button thereon.

It should be noted that the search criteria and output criteria shown in FIG. 14 to FIG. 18 are set as required, therefore items are not limited to the items described above. It is not always necessary to use all the items described above. Namely, only items required for each document information management system discretely constructed may be used.

In accordance with Embodiment 5 as described above, in addition to the same effect as that in Embodiment 1, the search-engine-compatible interface unit displays a menu for specifying search criteria and output criteria for the search engine in a space adjacent to a specified word, and performs a search and output according to the specified word as well as to the menu items specified by the cursor, so that workability and convenience for the user can further be improved.

As described above, in the document information management system according to the present invention, the search-engine-compatible interface unit makes a word in a document displayed on the screen to be specified, transfers the specified word to a search engine as a keyword to be used in the search engine, receives a search result from the search engine, and displays the search result on the screen, and the browser-compatible interface unit performs a search by using the keyword transferred from a browser and transfers a search result to the browser, so that, by performing a search (a keyword search and/or a global search) with a word which is not liked to any document as a keyword through a clicking operation on the word, and enabling jumping from the clicked word to a page as an object to be searched like that with a button of a hypertext, it is possible to improve convenience in document information management as well as in a document search, operability of a keyword search, and further workability when a search is performed through a hypertext.

In the document information management system according to another aspect of the present invention, a list for a pop-up menu is prepared from a keyword-search result and the pop-up menu is displayed on the screen, so that workability and convenience for the user can further be improved.

In the document information management system according to another aspect of the present invention, a search-engine-compatible interface unit makes a word in a document displayed on the screen to be specified, actuates a search engine and makes the search engine perform a search with the specified word as a keyword to be used in the search engine, receives a search result from the search engine and displays the result on the screen, so that, by performing a search with a word which is not linked to any document as a keyword through a clicking operation on the word, and enabling jumping from the clicked word to a page as an object to be searched like that with a button of a hypertext, it is possible to improve convenience in document information management as well as in a document search, operability of a keyword search, and further workability when a search is performed through a hypertext.

In the document information management system according to another aspect of the present invention, a document file has a word table prepared by previously cutting out words included in the document file, so that a word as a keyword can efficiently be identified.

In the document information management system according to another aspect of the present invention, a hypertext document has a dummy button obtained by previously cutting out a word included in the document and setting a linked target of the word as a particular address information for responding to actuation of the search engine, so that a word as a keyword can efficiently be identified and also a search engine can easily be actuated.

In the document information management system according to another aspect of the present invention, a search-engine-compatible interface unit cuts out, in the document displayed on the screen, a character string from a header character to an end character pointed by a cursor as a word, and identifies the cut-out word as a keyword to be used in the search engine, so that a word as a keyword can efficiently be identified.

In the document information management system according to another aspect of the present invention, a search-engine-compatible interface unit evaluates, in the document displayed on the screen, an expanded character string obtained by adding characters or character strings before and after a character pointed by a cursor thereto based on a word cut-out technology such as morpheme analysis, cuts out an optimal word, and identifies the cut-out word as a keyword to be used in the search engine, so that a word as a keyword can accurately and efficiently be identified.

In the document information management system according to another aspect of the present invention, a document file has a word table prepared by previously cutting out words included in the document file, and a search-engine-compatible interface unit selects, in the document displayed on the screen, a plurality of expanded character strings each obtained by adding characters or character strings before and behind a character pointed by a cursor thereto, compares the selected strings to the words in the word table to evaluate the strings, and identifies an optimal word as if the word is pointed by the cursor as a keyword to be used in the search engine, so that a word as a keyword can accurately and efficiently be identified.

In the document information management system according to another aspect of the present invention, a hypertext document has a dummy button obtained by previously evaluating a word included in the document based on a word cut-out technology such as morpheme analysis, cutting out the word, and setting a linked target of the word as a particular URL for responding to actuation of a search engine, and a search-engine-compatible interface unit identifies, when the dummy button is pointed by the cursor, a word corresponding to the dummy button as a keyword to be used in the search engine, and also actuates the search engine according to the URL for the dummy button, so that a word as a keyword can accurately and efficiently be identified, and also a search engine can easily be actuated.

In the document information management system according to another aspect of the present invention, a search-engine-compatible interface unit displays a menu for specifying search criteria and output criteria for a search engine in a space adjacent to a specified word, and performs a search and output according to the specified word as well as to the menu items specified by the cursor, so that workability and convenience for the user can further be improved.

In the document information management system according to another aspect of the present invention, databases or the filing units are Web servers connected to each other through the Internet or an intranet, so that information can be collected from a wide range thereof through the Internet or the intranet.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information management system, comprising:
   an identification unit that identifies a word displayed in an image on a display device to be a keyword and the keyword is specified by a cursor on the display device;
   a transfer unit that transfers the keyword to a search unit; and
   a receiver that receives a search result corresponding to the keyword, wherein the display device is configured to display information corresponding to the search result, and to display additional information corresponding to a selection of a portion of the displayed information.

2. An information management system according to claim 1, further comprising:

said search unit;

a selection unit configured to receive an input from a user who selects a portion of the displayed information; and at least one database for storing therein at least one file.

3. A system according to one of claims 1 and 2, wherein: said search unit is a search engine accessible by a browser.

4. A system according to claim 3, wherein the search engine is included in a web server.

5. A system according to one of claims 1 and 2, wherein:

said search unit is a separate device from a device including the identification unit.

6. A system according to claim 1, wherein:

the identification unit identifies the word using a pointing device.

7. A system according to claim 6, wherein:

the identification unit identifies the word using a mouse.

8. A system according to one of claims 1 and 6, wherein:

the identification unit identifies the word using a cursor position.

9. A system according to claim 1, wherein the additional information is displayed without altering a file corresponding to the image on the display device.

10. The system according to claim 1, wherein the display device displays a pop-up menu prepared based on the search result.

11. The system according to claim 1, wherein the word identified by the identification unit is a non-linked word.

12. The system according to claim 2, wherein when a file comprising a hypertext file or a non-hypertext file is displayed on the display device, the identification unit identifies the word from the file as the keyword specified by the cursor on the display device.

13. The system according to claim 2, further comprising:

a search criteria specification unit which displays on the display device, in a space adjacent to the keyword, a menu for specifying search criteria for the search unit, the menu comprising menu items to be specified by a cursor, wherein the transfer unit transfers the keyword and the menu items specified to the search unit.

14. The system according to claim 13, wherein the menu is for specifying at least one search database.

15. The system according to claim 1, further comprising:

an output criteria specification unit which displays on the display device, in a space adjacent to the keyword, a menu for specifying output criteria of the search result.

16. The system according to claim 15, wherein the menu is for specifying where to output the result of the search.

17. The apparatus according to claim 1, further comprising: an interface having a browsing function.

18. A information management apparatus, comprising:

at least one database for storing therein at least one file;

an interface configured to display on a display device a hypertext file prepared by a hypertext description language or a non-hypertext file prepared by a word processing application;

an extraction unit that extracts a displayed word identified by a cursor on the display device as a keyword;

a transfer unit that transfers the keyword to a search engine; and a receiver that receives a search result corresponding to the keyword from the search engine, wherein said display device is configured to display additional information upon selecting a portion of a displayed search result.

19. The apparatus according to claim 18, wherein:

said display device displays a pop-up menu, the pop-up menu is prepared based on the search result.

20. The apparatus according to claim 18, wherein the word extracted by the extraction unit is a non-linked word.

21. The apparatus according to claim 18, wherein when the at least one file is displayed on the display device, the extraction unit extracts the displayed word as the keyword specified by the cursor on the display device.

22. The apparatus according to claim 18, further comprising:

a search criteria specification unit which displays on the display device, in a space adjacent to the keyword, a menu for specifying search criteria for the search engine, the menu comprising menu items to be specified by the cursor, wherein the transfer unit transfers the keyword and the menu items specified to the search engine.

23. The apparatus according to claim 22, wherein the menu is for specifying at least one search database.

24. The apparatus according to claim 18, further comprising:

an output criteria specification unit which displays on the display device, in a space adjacent to the keyword, a menu for specifying output criteria of the search result.

25. The apparatus according to claim 24, wherein the menu is for specifying where to output the result of the search.

26. An information management method, comprising:

identifying a word of an image displayed on a display device as a keyword and the keyword is specified by a cursor on the display device;

transferring the keyword to a device configured to search;

receiving, from the device configured to search, a search result corresponding to the keyword;

displaying information corresponding to the search result; and displaying additional information corresponding to a selection of a portion of the displayed information.

27. The method according to claim 26, wherein the step of displaying additional information is performed without altering a file corresponding to the image on the display device.

28. The method according to claim 26, further comprising the step of:

selecting, after the step of displaying information and before the step of displaying additional information, the portion of the displayed information.

29. The method according to claim 26, wherein said device configured to search is a search engine accessible by a browser.

30. The method according to claim 29, wherein the device configured to search is included in a web server.

31. The method according to claim 26, wherein:

the device configured to search is a different device from a device performing the identifying step.

32. The method according to claim 26, wherein:

the step of identifying a word is performed using a pointing device.

33. The method according to claim 32, wherein:
the step of identifying a word is performed using a mouse.

34. The method according to claim 26, wherein:
the step of identifying a word is performed using a cursor position.

35. The method according to claim 26, further comprising:
displaying on the display device a pop-up menu prepared based on the search result.

36. The method according to claim 26, wherein the word extracted is a non-linked word.

37. The method according to claim 26, wherein when a file is displayed on the display device, the word from the file is extracted as the keyword specified by a cursor on the display device.

38. The method according to claim 26, further comprising:
displaying on the display device, in a space adjacent to the keyword, a menu comprising menu items for specifying search criteria for a search engine; and
specifying the menu items by a cursor, wherein
the keyword and the menu items specified are transferred to the search engine.

39. The method according to claim 38, wherein the menu is for specifying at least one search database.

40. The method according to claim 26, further comprising:
displaying on the display device, in a space adjacent to the keyword, a menu for specifying output criteria of the search result.

41. The method according to claim 40, wherein the menu is for specifying where to output the result of the search.

42. In an information management system, a method of enabling user-requested information to be associated with information stored in at least one database, the method comprising:
selecting a word or a character string displayed in a document displayed on a display device;
recognizing and extracting the selected word or the character string so as to initiate a keyword search wherein the keyword is specified by a cursor on the display device or a character string search;
receiving a search result corresponding to the keyword or the character string;
creating an association of the selected word or the character string with the search result; and
displaying, within said document, the created association and additional information corresponding to the search result upon selection of a portion of the created association.

43. The method as in claim 42, wherein the displaying step is performed by displaying the association as a list in a pop-up menu in the document.

44. The method as in claim 42, wherein the displaying step is performed by displaying the association as a list as a pull-down menu in the document.

45. The method as in claim 42, wherein the association of the selected word or the character string is displayed in a pull-down menu adjacent to the selected word in the document.

46. The method as in claim 42, further comprising:
communicatively coupling said one or more databases to a network.

47. The method as in claim 42, wherein the step of creating an association includes providing links to the related information.

48. The method as in claim 42, further comprising:
enabling the user to access information related to the selected word directly from within said document.

49. The method as in claim 48, wherein the enabling step comprises:
requesting a source code of the accessed information;
transferring the source code to a browser;
developing the source code into a hypertext file or a non-hypertext file; and
displaying the developed file.

50. In an information management system, a method of enabling user-selected information to be associated with information stored in at least one database having a hypertext file prepared with a hypertext-description language or a non-hypertext file prepared with a word processing application, the method comprising:
selecting a word displayed in a document displayed on a display device;
recognizing and extracting the selected word as a keyword for initiating a search wherein the keyword is specified by a cursor on the display device;
enabling a user to invoke a list of actions upon recognizing the selected word by displaying the list of actions in a menu adjacent to the selected word; and
enabling a user to display additional information upon invoking an action from among the list of actions.

51. The method as in claim 50, further comprising:
communicatively coupling said at least one database to a network.

52. The method as in claim 50, wherein the list of actions includes:
launching a website in a new instance of a web-browser.

53. The method as in claim 50, further comprising:
displaying the selected word in a form so as to distinguish the selected word from other displayed words.

54. The method as in claim 50, further comprising:
displaying the selected word in a reverse video mode so as to distinguish the selected word from other displayed words.

55. The method as in claim 50, wherein the recognizing step is performed by comparing the selected word with a predetermined list of words by a search engine compatible interface unit.

56. A computer program product having a computer-usable medium, comprising:
instructions for identifying a word displayed in an image on a display device as a keyword wherein the keyword is specified by a cursor on the display device;
instructions for transferring the keyword to a search unit; and
instructions for displaying information corresponding to the search result, and to display additional information corresponding to a selection of a portion of the displayed information.

57. A computer program product having a computer-usable medium, comprising:
instructions for storing at least one file in at least one database;
instructions to display on a display device a hypertext file prepared by a hypertext description language or a non-hypertext file prepared by a word processing application;
instructions for extracting a displayed word specified by a cursor on the display device as a keyword;

instructions for transferring the keyword to a search engine; and instructions for receiving a search result corresponding to the keyword from the search engine, wherein said instructions to display include instructions to display additional information upon selecting a portion of displayed search result.

58. A document information management apparatus, comprising:

a database unit storing a plurality of documents including at least a non-hypertext document;

a display operation unit configured to display the non-hypertext document on a display device and to process the non-hypertext document; and a search unit configured to search in the database unit for a document corresponding to a keyword specified in the non-hypertext document displayed on the display device, wherein the keyword is specified by a cursor on the display device, a word in the document displayed on the display device is specified by the display operation unit as the keyword to be searched by the search unit, and a result of the search is displayed on the display device.

59. A document information management apparatus, comprising:

a database unit storing a plurality of document files;

a display operation unit configured to display a document on a display device and to process the document; and a search unit configured to search in the database unit for a document corresponding to a keyword specified in the document displayed on the display device, wherein the keyword is specified by a cursor on the display device, a non-hypertext word in the document displayed on the display device is specified, using the display operation unit, as the keyword to be searched by the search unit, and a result of the search is displayed on the display device.

60. A document information management method, comprising:

storing a plurality of documents, including at least a non-hypertext document, in a database unit;

displaying the non-hypertext document on a display device and processing the non-hypertext document using a display operation unit;

searching in the database unit for a document corresponding to a keyword specified in the non-hypertext document displayed on the display device, wherein the keyword is specified by a cursor on the display device, a word in the document displayed on the display device is specified by the display operation unit as the keyword to be searched, and a result of the search is displayed on the display device.

61. A web browser configured to execute the method steps recited in claim 60.

62. A document information management method, comprising:

storing a plurality of document files in a database unit;

displaying a document on a display device and processing the document using a display operation unit; and searching in the database unit for a document corresponding to a keyword specified in the document displayed on the display device, wherein the keyword is specified by a cursor on the display device, a non-hypertext word in the document displayed on the display device is specified, using the display operation unit, as the keyword to be searched, and a result of the search is displayed on the display device.

63. A web browser configured to execute the method steps recited in claim 62.

64. A computer program product storing program instructions for execution on a computer system, which when executed by the computer system, cause the computer system to perform the steps of:

storing a plurality of documents, including at least a non-hypertext document, in a database unit;

displaying the non-hypertext document on a display device and processing the non-hypertext document using a display operation unit;

searching in the database unit for a document corresponding to a keyword specified in the non-hypertext document displayed on the display device, wherein the keyword is specified by a cursor on the display device, a word in the document displayed on the display device is specified by the display operation unit as the keyword to be searched, and a result of the search is displayed on the display device.

65. A computer program product storing program instructions for execution on a computer system, which when executed by the computer system, cause the computer system to perform the steps of:

storing a plurality of document files in a database unit;

displaying a document on a display device and processing the document using a display operation unit; and searching in the database unit for a document corresponding to a keyword specified in the document displayed on the display device, wherein the keyword is specified by a cursor on the display device, a non-hypertext word in the document displayed on the display device is specified, using the display operation unit, as the keyword to be searched, and a result of the search is displayed on the display device.

66. An information management apparatus comprising:

means for selecting a word displayed in a document displayed on a display device;

means for recognizing and extracting the selected word as a keyword for initiating a search wherein the keyword is specified by a cursor on the display device;

means for enabling a user to invoke a list of actions upon recognizing the selected word by displaying the list of actions in a menu adjacent the selected word; and means for enabling a user to display additional information upon invoking an action from among the list of actions.

\* \* \* \* \*

(12) EX PARTE REEXAMINATION CERTIFICATE (10318th)
United States Patent
Yano et al.

(10) Number: US 6,658,408 C1
(45) Certificate Issued: Oct. 9, 2014

(54) DOCUMENT INFORMATION MANAGEMENT SYSTEM

(75) Inventors: Takashi Yano, Tokyo (JP); Yasuhiro Tabata, Kanagawa (JP); Hisashi Ishijima, Kanagawa (JP)

(73) Assignee: Ricoh Company, Ltd., Ohta-Ku, Tokyo (JP)

Reexamination Request:
No. 90/013,121, Jan. 16, 2014

Reexamination Certificate for:
Patent No.: 6,658,408
Issued: Dec. 2, 2003
Appl. No.: 10/126,588
Filed: Apr. 22, 2002

Related U.S. Application Data

(63) Continuation of application No. 09/305,473, filed on May 6, 1999, now Pat. No. 6,381,593.

(30) Foreign Application Priority Data

May 8, 1998 (JP) .................................... 10-126515
Aug. 18, 1998 (JP) .................................... 10-231845

(51) Int. Cl.
*G06F 17/30* (2006.01)

(52) U.S. Cl.
USPC ............... 707/708; 707/999.003; 707/999.01; 707/999.104; 707/E17.062; 715/738; 715/968

(58) Field of Classification Search
None
See application file for complete search history.

(56) References Cited

To view the complete listing of prior art documents cited during the proceeding for Reexamination Control Number 90/013,121, please refer to the USPTO's public Patent Application Information Retrieval (PAIR) system under the Display References tab.

*Primary Examiner* — Simon Ke

(57) ABSTRACT

A document information management system in which a search-engine-compatible interface unit makes a word in a document displayed on the screen to be specified, transfers the specified word to a search engine as a keyword to be used in the search engine, receives a search result from the search engine, and displays the search result on the screen, while a browser-compatible interface unit performs a search (a keyword search and/or global search) by using the keyword transferred from a browser and transfers a search result to the browser.

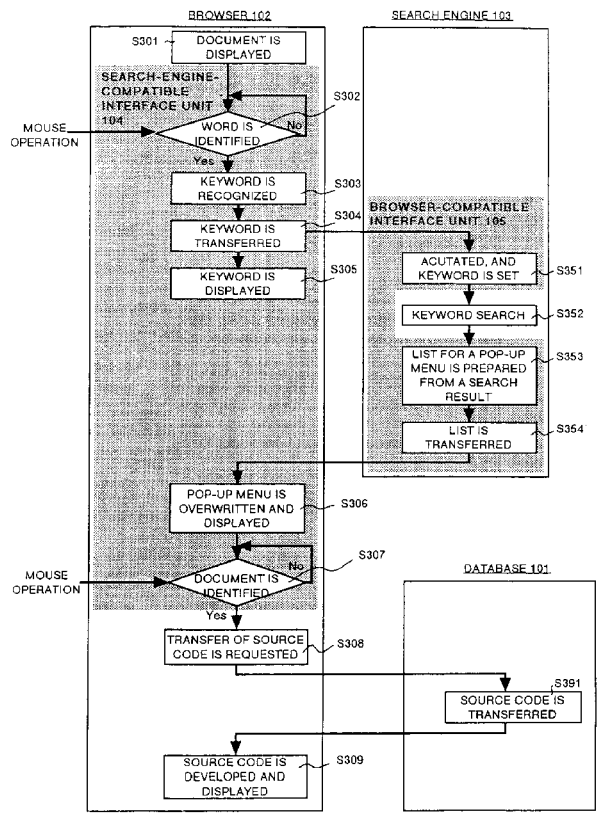

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 15, 16, 18, 24-28, 40-44, 50, 56-60, 62 and 64-66 are determined to be patentable as amended.

Claims 2-8, 10-13, 17, 19-22, 29-38, 45-49, 51-55, 61 and 63, dependent on an amended claim, are determined to be patentable.

Claims 14, 23 and 39 were not reexamined.

1. An information management system, comprising:
an identification unit that identifies a word displayed in an image on a display device to be a keyword and the keyword is specified by a cursor on the display device;
a transfer unit that transfers the keyword to a search unit; and
a receiver that receives a search result corresponding to the keyword, wherein the display device is configured to display [information corresponding to] the search result *as a list of selectable items*, and to display [additional information corresponding] *a sub-menu in response* to a selection of [a portion of the displayed information] *an item in the list*.

9. A system according to claim 1, wherein the [additional information] *sub-menu* is displayed without altering a file corresponding to the image on the display device.

15. The system according to claim 1, further comprising:
an output criteria specification unit which displays on the display device, in a space adjacent to the keyword, [a menu] *the sub-menu, which is* for specifying output criteria of the search result.

16. The system according to claim 15, wherein the [menu] *sub-menu* is for specifying where to output the result of the search.

18. [A] *An* information management apparatus, comprising:
at least one database for storing therein at least one file;
an interface configured to display on a display device a hypertext file prepared by a hypertext description language or a non-hypertext file prepared by a word processing application;
an extraction unit that extracts a displayed word identified by a cursor on the display device as a keyword;
a transfer unit that transfers the keyword to a search engine; and
a receiver that receives a search result corresponding to the keyword from the search engine, wherein said display device is configured to display [additional information upon selecting a portion of a displayed search result] *the search result as a list of selectable items and to display a sub-menu in response to selection of an item in the list*.

24. The apparatus according to claim 18, further comprising:
an output criteria specification unit which displays on the display device, in a space adjacent to the keyword, [a menu] *the sub-menu, which is* for specifying output criteria of the search result.

25. The apparatus according to claim 24, wherein the [menu] *sub-menu* is for specifying where to output the result of the search.

26. An information management method, comprising:
identifying a word of an image displayed on a display device as a keyword and the keyword is specified by a cursor on the display device;
transferring the keyword to a device configured to search;
receiving, from the device configured to search, a search result corresponding to the keyword;
displaying [information corresponding to] the search result *as a list of selectable items*; and
displaying [additional information corresponding to] *a sub-menu in response* to a selection of [a portion of the displayed information] *an item in the list*.

27. The method according to claim 26, wherein the step of displaying [additional information] *the sub-menu* is performed without altering a file corresponding to the image on the display device.

28. The method according to claim 26, further comprising the step of:
selecting, after the step of displaying [information] *the search result* and before the step of displaying [additional information] *the sub-menu*, the [portion of the displayed information] *item in the list*.

40. The method according to claim 26, further comprising:
displaying on the display device, in a space adjacent to the keyword, [a menu] *the sub-menu, which is* for specifying output criteria of the search result.

41. The method according to claim 40, wherein the [menu] *sub-menu* is for specifying where to output the result of the search.

42. In an information management system, a method of enabling user-requested information to be associated with information stored in at least one database, the method comprising:
selecting a word or a character string displayed in a document displayed on a display device;
recognizing and extracting the selected word or the character string so as to initiate a keyword search wherein the keyword is specified by a cursor on the display device or a character string search;
receiving a search result corresponding to the keyword or the character string;
creating an association of the selected word or the character string with the search result; and
displaying, within said document, the created association *as a list* and [additional information corresponding to the search result upon] *displaying a sub-menu in response to* selection of [a portion of the created association] *an item in the list*.

43. The method as in claim 42, wherein the displaying step is performed by displaying the association as [a] *the* list in a pop-up menu in the document.

44. The method as in claim 42, wherein the displaying step is performed by displaying the association as [a] *the* list as a pull-down menu in the document.

50. In an information management system, a method of enabling user-selected information to be associated with information stored in at least one database having a hypertext file prepared with a hypertext-description language or a non-hypertext file prepared with a word processing application, the method comprising:

selecting a word displayed in a document displayed on a display device;

recognizing and extracting the selected word as a keyword for initiating a search, wherein the keyword is specified by a cursor on the display device;

enabling a user to invoke a list of actions upon recognizing the selected word by displaying the list of actions in a menu adjacent to the selected word; and enabling a user to display [additional information] *a sub-menu* upon invoking an action from among the list of actions.

56. A computer program product having a computer-usable medium, comprising:

instructions for identifying a word displayed in an image on a display device as a keyword wherein the keyword is specified by a cursor on the display device;

instructions for transferring the keyword to a search unit; and instructions for displaying [information corresponding to] the search result *as a list of selectable items*, and [to display additional information corresponding] *for displaying a sub-menu in response* to a selection of [a portion of the displayed information] *an item in the list*.

57. A computer program product having a computer-usable medium, comprising:

instructions for storing at least one file in at least one database;

instructions to display on a display device a hypertext file prepared by a hypertext description language or a non-hypertext file prepared by a word processing application;

instructions for extracting a displayed word specified by a cursor on the display device as a keyword;

instructions for transferring the keyword to a search engine; and instructions for receiving a search result corresponding to the keyword from the search engine, wherein said instructions to display include instructions to display [additional information upon selecting a portion of displayed search result] *the search result as a list of selectable items and to display a sub-menu in response to selection of an item in the list*.

58. A document information management apparatus, comprising:

a database unit storing a plurality of documents including at least a non-hypertext document;

a display operation unit configured to display the non-hypertext document on a display device and to process the non-hypertext document; and a search unit configured to search in the database unit for a document corresponding to a keyword specified in the non-hypertext document displayed on the display device, wherein the keyword is specified by a cursor on the display device, a word in the document displayed on the display device is specified by the display operation unit as the keyword to be searched by the search unit, [and] a result of the search is displayed on the display device *as a list of selectable items, and a sub-menu is displayed in response to selection of an item in the list*.

59. A document information management apparatus, comprising:

a database unit storing a plurality of document files;

a display operation unit configured to display a document on a display device and to process the document; and a search unit configured to search in the database unit for a document corresponding to a keyword specified in the document displayed on the display device, wherein the keyword is specified by a cursor on the display device, a non-hypertext word in the document displayed on the display device is specified, using the display operation unit, as the keyword to be searched by the search unit, [and] a result of the search is displayed on the display device *as a list of selectable items, and a sub-menu is displayed in response to selection of an item in the list*.

60. A document information management method, comprising:

storing a plurality of documents, including at least a non-hypertext document, in a database unit;

displaying the non-hypertext document on a display device and processing the non-hypertext document using a display operation unit;

searching in the database unit for a document corresponding to a keyword specified in the non-hypertext document displayed on the display device, wherein the keyword is specified by a cursor on the display device, a word in the document displayed on the display device is specified by the display operation unit as the keyword to be searched, [and] a result of the search is displayed on the display device *as a list of selectable items, and a sub-menu is displayed in response to selection of an item in the list*.

62. A document information management method, comprising:

storing a plurality of document files in a database unit;

displaying a document on a display device and processing the document using a display operation unit; and searching in the database unit for a document corresponding to a keyword specified in the document displayed on the display device, wherein the keyword is specified by a cursor on the display device, a non-hypertext word in the document displayed on the display device is specified, using the display operation unit, as the keyword to be searched, [and] a result of the search is displayed on the display device *as a list of selectable items, and a sub-menu is displayed in response to selection of an item in the list*.

64. A computer program product storing program instructions for execution on a computer system, which when executed by the computer system, cause the computer system to perform the steps of:

storing a plurality of documents, including at least a non-hypertext document, in a database unit;

displaying the non-hypertext document on a display device and processing the non-hypertext document using a display operation unit;

searching in the database unit for a document corresponding to a keyword specified in the non-hypertext document displayed on the display device, wherein the keyword is specified by a cursor on the display device, a word in the document displayed on the display device is specified by the display operation unit as the keyword to be searched, [and] a result of the search is displayed on the display device *as a list of selectable items, and a sub-menu is displayed in response to selection of an item in the list*.

65. A computer program product storing program instructions for execution on a computer system, which when executed by the computer system, cause the computer system to perform the steps of:
- storing a plurality of document files in a database unit;
- displaying a document on a display device and processing the document using a display operation unit; and
- searching in the database unit for a document corresponding to a keyword specified in the document displayed on the display device, wherein the keyword is specified by a cursor on the display device, a non-hypertext word in the document displayed on the display device is specified, using the display operation unit, as the keyword to be searched, [and] a result of the search is displayed on the display device *as a list of selectable items, and a sub-menu is displayed in response to selection of an item in the list*.

66. An information management apparatus comprising:
- means for selecting a word displayed in a document displayed on a display device;
- means for recognizing and extracting the selected word as a keyword for initiating a search, wherein the keyword is specified by a cursor on the display device;
- means for enabling a user to invoke a list of actions upon recognizing the selected word by displaying the list of actions in a menu adjacent the selected word; and
- means for enabling a user to display [additional information] *a sub-menu* upon invoking an action from among the list of actions.

* * * * *